United States Patent
Hirao et al.

(10) Patent No.: US 8,493,672 B2
(45) Date of Patent: Jul. 23, 2013

(54) IMAGING LENS, IMAGE PICKUP DEVICE AND PORTABLE TERMINAL

(75) Inventors: Yusuke Hirao, Sakai (JP); Keiji Matsusaka, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 370 days.

(21) Appl. No.: 12/866,371

(22) PCT Filed: Feb. 12, 2009

(86) PCT No.: PCT/JP2009/052297
§ 371 (c)(1),
(2), (4) Date: Aug. 5, 2010

(87) PCT Pub. No.: WO2009/101971
PCT Pub. Date: Aug. 20, 2009

(65) Prior Publication Data
US 2010/0321554 A1 Dec. 23, 2010

(30) Foreign Application Priority Data
Feb. 12, 2008 (JP) ................. 2008-030890

(51) Int. Cl.
*G02B 9/00* (2006.01)
*G02B 13/18* (2006.01)
*G02B 9/08* (2006.01)

(52) U.S. Cl.
USPC ............. 359/796; 359/718; 359/740

(58) Field of Classification Search
USPC .......... 359/796, 718, 740
See application file for complete search history.

(56) References Cited

U.S. PATENT DOCUMENTS

| | | | |
|---|---|---|---|
| 2006/0044450 A1 | 3/2006 | Wolterink et al. | 348/340 |
| 2007/0275505 A1 | 11/2007 | Wolterink et al. | 438/118 |
| 2010/0053770 A1* | 3/2010 | Sato et al. | 359/717 |
| 2010/0188759 A1* | 7/2010 | Sato et al. | 359/793 |

FOREIGN PATENT DOCUMENTS

| | | |
|---|---|---|
| CN | 1682377 A | 10/2005 |
| CN | 101278211 A | 10/2008 |
| EP | 1543564 A | 6/2005 |
| EP | 1943547 A | 7/2008 |
| JP | 10-333027 A | 12/1998 |
| JP | 2001-296473 A | 10/2001 |
| JP | 2004-109532 A | 4/2004 |
| JP | 2005-539276 A | 12/2005 |
| JP | 2006-323365 A | 11/2006 |
| JP | 2007-010750 A | 1/2007 |
| JP | 3926380 B1 | 3/2007 |
| JP | 3946245 B1 | 4/2007 |
| JP | 2007-126636 A | 5/2007 |
| JP | 2007-127953 A | 5/2007 |
| KR | 10-2007-0089889 A | 9/2007 |
| KR | 10-2007-0096020 A | 10/2007 |
| WO | WO 2004/027880 A2 | 4/2004 |
| WO | WO 2007/043492 A1 | 4/2007 |
| WO | WO 2009/101971 A1 | 8/2009 |

* cited by examiner

*Primary Examiner* — Scott J Sugarman
(74) *Attorney, Agent, or Firm* — Cozen O'Connor

(57) ABSTRACT

An imaging lens (LN) of an imaging device (ID) is composed of an aperture stop (ST) and a lens unit (LU) having positive power. Even when the object side surface of the lens unit (LU) has a shape convexed to the side of the object, and a lens whose image side surface is concaved to the image side is used, excellent aberration performance with a short optical total length, a small sensor incidence angle and a small distortion are achieved at low cost.

12 Claims, 20 Drawing Sheets

IMAGING LENS, IMAGE PICKUP DEVICE AND PORTABLE TERMINAL

RELATED APPLICATIONS

This is a U.S. National Phase under 35 U.S.C. §371 of International Application No. PCT/JP2009/052297, filed in the Japanese Patent Office on Feb. 12, 2009, which claims priority on Japanese Patent Application No. 2008-030890, filed on Feb. 12, 2008.

FIELD OF THE INVENTION

The present invention relates to an imaging lens, an image pickup device having the imaging lens, and a portable terminal having the image pickup device.

BACKGROUND OF THE INVENTION

In recent years, a compact and slim image pickup device has been mounted on a portable terminal, which is a compact and slim electronic device, including a cellular mobile phone and PDA (Personal Digital Assistant). This has permitted visual information as well as audio information to be exchanged between distant places. A solid state image sensor such as a CCD (Charge Coupled Device) type image sensor and CMOS (Complementary Metal Oxide Semiconductor) type image sensor is employed as an image sensor used in the image pickup device. Further, km the purpose of achieving low-cost production, a plastic lens that can be mass-produced at a lower cost is utilized as an imaging lens for forming a subject image on an image sensor.

One of the methods for producing a lens and optical system is a replica method wherein a plurality of lenses can be formed simultaneously on one parallel plane surface plate. The Patent Document 1 proposes an imaging lens wherein such a replica method is used to form a diffraction surface and refraction surface simultaneously on the parallel plane surface plate, whereby chromatic aberration is corrected.

The Patent Document 2 discloses an example of an imaging lens used in an image pickup device (camera module) incorporated in a portable terminal. The imaging lens of Patent Document 2 is made of one double-convex lens. This has succeeded in reducing the overall optical length. However, the double-convex lens cannot easily reduce a longitudinal chromatic aberration. Moreover, a field curvature is large on the periphery. In addition, when the image side surface is convex toward the image side, an inflection point must be provided on the image side surface so as to allow the peripheral portion and the paraxial portion to have different powers, so that the focal distance of the light beam through the peripheral portion of the lens has a larger focal length and the image plane is adjusted. In this case, however, astigmatism occurs close to the mid-band area wherein the inflection point is provided, with the result that the MTF (Modulation Transfer Function) is seriously deteriorated.

For example, the imaging lens of Patent Document 3 is composed of a meniscus lens convex toward the image side. However, the configuration of this imaging lens has a large negative distortion, and that distortion is difficult to reduce.

Patent Document 1: Japanese Unexamined Patent Application Publication No. 2006-323365
Patent Document 2: Japanese Unexamined Patent Application Publication No. 2007-10750
Patent Document 3: Japanese Unexamined Patent Application Publication No. 2001-296473

DISCLOSURE OF INVENTION

Problems to be Solved by the Invention

In view of the foregoing, one possible way of getting an excellent aberration performance at a lower cost is to constitute an imaging lens by using one lens (a lens unit including a cemented lens) whose object side surface is convex toward the object side and whose image side surface is concave toward the image side. In this case, however, if the powers of the object side surface and image side surface are not appropriately set, the incident angle to the sensor (image sensor) is too large and the positive distortion is too large to ensure excellent aberration performances.

In view of the problems described above, it is an object of the present invention to provide an imaging lens, an image pickup device having the imaging lens, and a portable terminal having the image pickup device, in which the overall length is short, the production cost is low, and the aberration performances are excellent, even though a lens (lens unit) whose object side surface is convex toward the object side and whose image side surface is concave toward the image side is used.

Means for Solving the Object

An imaging lens according to the present invention has an aperture stop and an optical element having a power,
wherein the optical element is a lens unit having a positive power;
the lens unit is a cemented lens made up of three lens portions,
if each of the three lens portions is assumed to be, from an object side, a first lens,
a second lens, and a third lens, the first lens is a plano-convexo lens with the convex surface directed toward the object side;
the second lens is a parallel plane plate; and
the third lens is a plano-concavo lens with the concave surface directed to an image side,
wherein the first lens and the second lens is directly or indirectly cemented to each other, the second lens and the third lens are directly or indirectly cemented to each other, and if a focal length of the first lens of the lens unit is assumed to be f1, a focal length of the third lens is assumed to be f2, the following conditional expression (1) is satisfied, $$-0.7 \leq f1/f2 < 0 \tag{1}.$$

An imaging lens according to the present invention may comprise a parallel flat surface plate provided on the object side of the lens unit.

An imaging lens according to the present invention, wherein if a thickness of the parallel plane surface plate is assumed to be Dg, and a focal length of an overall optical system is assumed to be f, the following conditional expression (3) is preferably satisfied, $$0.1 \leq Dg/f < 1.0 \tag{3}.$$

An imaging lens according to the present invention, wherein the parallel plane surface plate satisfies the following conditional expression (4) is preferably satisfied, $$(l_2 - l_1)/f < 0.14 \tag{4}$$

where:
$l_1$ is an optical path length of an axial ray between an image side surface of the lens unit and an image plane;

$l_2$ is an optical path length of a principal ray at a maximum image height between the image side surface of the lens unit and the image plane; and f is an overall focal length.

An imaging lens according to the present invention, wherein the aperture stop may be disposed on a boundary surface between the first lens and the second lens.

An imaging lens according to the present invention, wherein the first lens and the third lens are preferably made of resin.

An imaging lens according to the present invention, wherein the first lens and the third lens are preferably made of curable resin.

An imaging lens according to the present invention, wherein there are preferably dispersed inorganic fine particles with a maximum length of 30 nm or less in the first lens and the third lens.

An imaging lens according to the present invention, wherein the imaging lens is preferably manufactured by a method comprising the steps of:

forming a plurality of lens portions simultaneously on a parallel plane plate;

sealing the parallel plane plate and another substrate through a lattice-shaped spacer sandwiched therebetween; and cutting apart the parallel plane plate, the substrate, and the spacer, which have all been integrated into one body, along a lattice of the spacer.

An imaging lens according to the present invention, wherein in the lens unit, at least a surface being in contact with air and having a power is preferably aspherical.

An image pickup device according to the present invention, comprising:

the aforementioned imaging lens according to the present invention; and an image sensor which receives light obtained through the imaging lens to generate an electric signal depending on an amount of received light.

A portable terminal, comprising the aforementioned image pickup device according to the present invention.

Effects of the Invention

According to the present invention, a cemented lens made of three lens sections is used to meet a predetermined conditional relationship, whereby an imaging lens characterized by a shorter overall optical length, a compact configuration, a small sensor incident angle, a smaller distortion and excellent aberration performances can be obtained at a low production cost, although this imaging lens uses a lens (lens unit) whose object side surface is convex toward the object side and whose image side surface is concave toward the image side.

DESCRIPTIONS OF THE DRAWINGS

DESCRIPTION OF REFERENCE NUMERALS

AX: Optical axis
B1: Spacer member
B2: Substrate
CU: Portable terminal
ID: Image pickup device
LN: Imaging lens
LU: Lens unit
L1: 1st lens
L2: 2nd lens
L3: 3rd lens
Lp: Positive lens
Ln: Negative lens
PT: Parallel plane surface plate SR: Image sensor
ST: Aperture stop

BEST MODE FOR CARRYING OUT THE INVENTION

The following describes the embodiment according to the present invention with reference to drawings. In the first place, the approximate configuration of each embodiment and referential form will be explained. In the embodiments and referential forms, differences are found in the surface power and on-axis surface distance. The details (construction data and others) will be shown with reference to the examples and referential examples to be described later.

Figure 27:
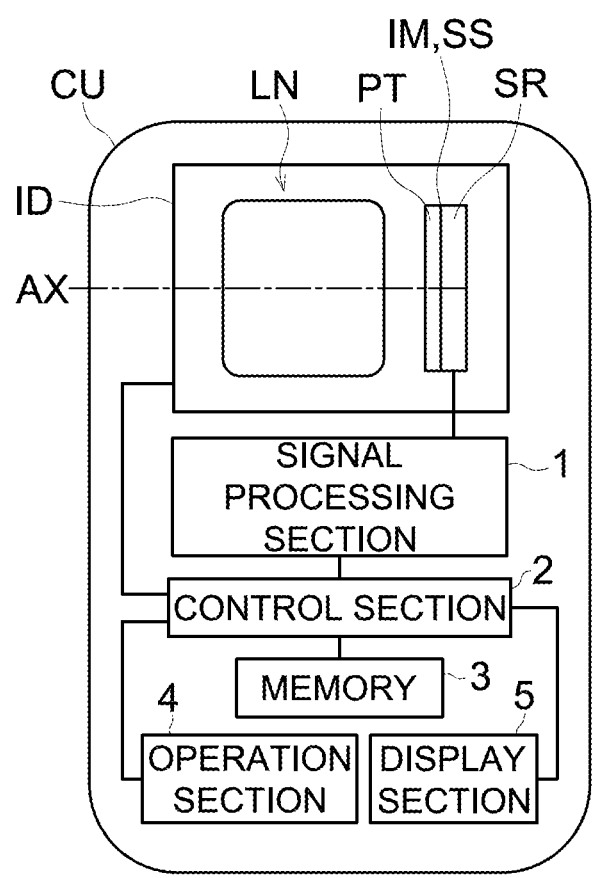
FIG. 27 is an explanation diagram showing a schematic configuration of a portable terminal.

FIGS. 1 and 3 through 7 are the cross sectional views representing the approximate configuration of the image pickup device ID related to the Referential forms 1 and 3 through 7, while the FIGS. 2 and 8 through 12 are the cross sectional views representing the approximate configuration of the image pickup device ID related to the Referential forms 2 and 8 through 12. The image pickup device ID is applicable to the portable terminal CU (FIG. 27).

The image pickup device ID of the referential form 1 includes, from the object side, an imaging lens LN and image sensor SR. The imaging lens LN is used to form the optical image (image surface) of an object on the light receiving surface of the image sensor SR, and includes, from the object side, an aperture stop ST and a lens unit LU as an optical element having a power. In the referential form 1, the lens unit LU is made of a single lens having a positive power, and constitutes a meniscus lens wherein the object side surface is convex toward the object side and the image side surface is concave toward the image side.

The image sensor SR receives the light obtained through the imaging lens LN, and emits electric signals in conformity to the amount of light received. The image sensor SR is made up of a solid image sensor having a plurality of pixels, such as a CCD type image sensor and CMOS image sensor, for example. The imaging lens LN is provided so that the optical image of the subject will be formed on the light receiving surface of the image sensor SR. The optical image formed by the imaging lens LN is converted into electric signals by the image sensor SR.

In the image pickup device ID of the embodiment 2, the lens unit LU of the imaging lens LN of the referential form 1 is made of a cemented lens made of three lens sections. The lens unit LU includes, from the object side, a 1st lens L1, 2nd lens L2 and 3rd lens L3. It has a positive power as a whole. The 1st lens L1 is a piano-convex lens convex toward the object side and is formed of resin, for example. The 2nd lens L2 is a parallel plane plate and is formed of glass, for example. The 3rd lens L3 is a piano-concave lens concave toward the image side, and is formed of resin, for example. The 1st lens L1 and 2nd lens L2 are bonded directly or indirectly. The 2nd lens L2 and 3rd lens L3 are bonded directly or indirectly. In this case, indirect bonding can be defined as bonding through the adhesive layer or bonding through an optical-function thin film such as an infrared ray cut filter, for example.

The image pickup device ID of the referential form 3 is configured in such a way that a parallel plane surface plate PT is provided on the image side of the lens unit LU of the referential form 1. The parallel plane surface plate PT is made of an optical filter (e.g., optical low-pass filter and infrared cut filter) and the cover glass of the image sensor SR, and is placed in front of the image sensor SR. To be more specific, the imaging lens LN of the referential form 3 includes, from the object side, an aperture stop ST, lens unit LU (meniscus lens) and parallel plane surface plate PT.

The image pickup device ID of the referential form 4 is configured in such a way that the lens unit LU of the referential form 1 is composed of a cemented lens made of two lens sections. To be more specific, the lens unit LU includes, from the object side, a positive lens Lp and a negative lens Ln. It has a positive power as a whole. The positive lens Lp is configured in such a way that the object side surface is convex toward the object side. The negative lens Ln is configured in such a way that the image side surface is concave toward the image side. The positive lens Lp and negative lens Ln are bonded directly or indirectly.

The image pickup devices ID of the referential forms 5 and 6 are configured in such a way that a parallel plane surface plate PT is provided on the image side of the referential form 4. To be more specific, the imaging lens LN of the referential forms 5 and 6 include, from the object side, an aperture stop ST, lens unit LU (two cemented lense) and parallel plane surface plate PT.

In the image pickup device ID of the referential form 7, the positive lens Lp of the referential forms 5 and 6 is made of the piano-convex lens whose object side surface is convex toward the object side, and whose negative lens Ln is formed of the piano-concave lens wherein the image side surface is concave toward the image side.

In the image pickup devices ID of the embodiments 8 through 11, a parallel plane surface plate PT is arranged on the image side of each lens unit LU of the embodiment 2. To be more specific, each imaging lens LN of the embodiments 8 through 11 includes, from the object side, an aperture stop ST, lens unit LU (three cemented lenses) and parallel plane surface plate PT.

The image pickup device ID of the embodiment 12 is structured in such a way that the aperture stop ST of the embodiment 8 through 11 is located at the boundary surface between the 1st lens L1 and 2nd lens L2. Thus, the 1st lens L1 and 2nd lens L2 are indirectly bonded through the aperture stop ST. To be more specific, the imaging lens LN of the embodiment 12 includes, from the object side, the 1st lens L1, aperture stop ST, 2nd lens L2, 3rd lens L3 and parallel plane surface plate PT.

The following describes the details of the image pickup devices ID of the referential forms 1 and 3 through 7, and the imaging lenses LN of the embodiments 2 and 8 through 12.

As described above, the imaging lenses LN of each referential form and embodiment are provided with the aperture stop ST and an optical element having a power. The optical element having a power is made of one lens unit LU having a positive power. The lens unit LU can be made of a single lens or a cemented lens. The object side surface of the lens unit LU is convex toward the object side, and the image side surface is concave toward the image side.

As described above, when the image side surface is convex toward the image side, the inflection point is formed on the image side to increase the focal distance of the periphery to adjust the image side. This arrangement causes astigmatism to be produced close to the mid area, with the result that the MTF performance is seriously deteriorated. In the present invention, however, the image side surface is concave toward the image side. This arrangement eliminates the need of providing an inflection point close to the mid area, and the properties of the image surface curvature are similar on both the sagittal and meridional image surfaces. Thus, the astigmatism close to the mid area is reduced, and the image surface close to the mid area is stabilized, with the result that deterioration of the MTF performance close to the mid area is avoided.

When the focal length of the object side surface of the lens unit LU is assumed as f1 mm and the focal length of the image side surface is assumed as f2 mm, the imaging lens TN meets the following conditional expression (1):

$$-0.7 \leq f1/f2 < 0 \quad (1)$$

The conditional expression (1) defines the appropriate range of the ratio of the focal length f1 to the object side surface of the lens unit LU and the focal length f2 on the image side surface. If the lower limit of the conditional expression (1) is not satisfied, the power on the object side surface will be excessive and a compact imaging lens LN is not easily implemented. In addition, when the imaging lens LN of the present invention is applied to the image pickup device ID, the incident angle to the image sensor SR and the distortion is increased, and the excellent aberration performances is not obtained easily.

Accordingly when the conditional expression (1) is satisfied, a compact imaging lens LN having the short overall optical length is implemented. Further, the incident angle of the sensor is reduced, and excellent aberration performances with suppressed distortion are obtained. It should be noted that the overall optical length refers to the length between the most object side surface of the imaging lens LN and the image surface (light receiving surface of the image sensor SR).

If the conditional expression (1a) is preferably satisfied, a compact imaging lens is surely implemented, and excellent aberration performances are obtained. Further, the conditional expression (1b) is more preferably satisfied:

$$-0.5 \leq f1/f2 < 0 \quad (1a)$$

$$-0.3 \leq f1/f2 < 0 \quad (1b)$$

When the imaging lens LN is made of a lens and a lens holding plane plate (parallel plane plate), for example, the focal length is defined as follows: The focal length of the object side surface is equal to the focal length of the lens formed on the object side surface of the parallel plane plate. It represents the focal length wherein the object side of the lens is filled with air, and the image side is filled with the medium of the lens holding plane plate. In the meantime, the focal length of the image side surface is the focal length of the lens formed on the image side surface of the lens holding plane plate. It represents the focal length of the lens wherein the object side is filled with the medium of the lens holding plane plate, and the image side is filled with air.

When the lens unit LU is made of the non-cemented lens (single lens), the focal length is defined as follows in order to comply with the above description: The focal length of the object side surface represents the focal length when the object side of the lens is filled with air and the image side is filled with the same medium as that of the lens. In the meantime, the focal length of the image side surface represents the focal length when the object side is filled with the same medium as that of the lens and the image side is filled with air.

In the image pickup devices ID of the embodiments 2 and 8 through 12, the lens unit LU of the imaging lens LN is made of the aforementioned cemented lens of the 1st lens L1, 2nd lens L1 and 3rd lens L3. The 1st lens L1 and 2nd lens L2, and the 2nd lens L1 and 3rd lens L3 are directly or indirectly bonded.

When the lens unit LU is structured as shown above, the lens sections (1st lens L1, 2nd lens L1 and 3rd lens L3) are formed simultaneously in a great amount, by using a molding, die on the surface of the parallel plane plate (2nd lens L2) in the production of the imaging lens LN, as will be described. Thus, imaging lenses LN are produced. This makes it possible to produce an imaging lens LN compatible with the so-called wafer scale lens. This ensures an excellent high-volume production capacity.

As in the case of the imaging lens LN shown in the embodiment 12, the aperture stop ST can be located on the boundary surface between the 1st lens L1 and 2nd lens L2. In this case, in the process of producing a wafer scale lens, the aperture stop ST is printed on the parallel plane plate (2nd lens L2), whereby an imaging lens LN is produced. To put it other words, this method provides easy implementation of an imaging lens LN compatible with the wafer scale lens.

As described above, when the lens unit LU is made of a cemented lens made of three lenses, the 1st lens L1 and 3rd lens L3 are preferably made of resin, as described above. Since the resin material is characterized by excellent formability, the resin ensures easy formation of the shapes of the aspherical surfaces of the 1st lens L1 and 3rd lens L3.

Particularly, the 1st lens L1 and 3rd lens L3 are preferably made of the curable resin. The possible examples of the curable resins include a photo-curable resin which is curable by exposure to ultraviolet light, and a thermosetting resin which is curable by heat. These curable resins are characterized by excellent formability, and ensure easy transfer of the shape of the aspherical surface by using a molding die. Further, the 1st lens L1 and 3rd lens L3 are transferred onto a large-sized parallel plane plate (2nd lens L2) using a molding die, whereby a great number of imaging lenses LN can be produced simultaneously. The curable resin is also characterized by excellent compatibility with the replica method (to be described later).

When the curable resin is used, the 1st lens L1 and 3rd lens L3 can be bonded onto the 2nd lens L2 directly or indirectly in an easy manner. The curable resin is preferred to have a heat resistance. Use of a heat resistant resin ensures the product to be compatible with a camera module capable of withstanding the reflow method. Thus, a less costly camera module can be provided. The reflow method here refers to the process wherein solder paste is printed on a printed circuit board (circuit board), parts (camera module) are mounted thereon, and the solder is melted by heat, whereby the sensor external terminal and circuit board are automatically welded.

The 1st lens L1 and 3rd lens L3 made of resin preferably contain dispersed inorganic particles having a maximum length of 30 manometers. The following describes the reason:

A change of refractive index according to temperature will be described in details. The change TA of refractive index due to temperature can be represented by the following equation by differentiating the refractive index n with respect to temperature t, based on the Lorentz-Lorenz equation:

$$TA(=dn/dt)=\{(n^2+2)(n^2-1)/6n\}\times\{(-3\alpha)+(1/[R])(\partial[R]/\partial t)\}$$

wherein:

α is a linear expansion coefficient; and

[R] is molecular refraction.

When a plastic material is used as a resin, for example, generally, the contribution of the second term is smaller than that of the first term of the formula and can be ignored almost completely. For example, when the PMMA resin is used, the linear expansion coefficient α is $7\times10^{-5}$. When this is substituted into the aforementioned formula, TA=$-1.2\times10^{-4}$[/° C.], which is approximately equal to the actual measurement.

Regarding the changes in refractive index, it has been made clear in recent years that change with temperature can be reduced by mixing inorganic particles into the plastic material. To put it in more detail, when fine particles are mixed into transparent plastic material, light-scattering generally occurs and transmittance is reduced. Thus, it has been difficult to use them as an optical material. However, when the size of the particles is reduced below the wavelength of the light beam to be transmitted, light-scattering does not occur substantially. In addition, the refractive index of plastic material decreases with temperature. Instead, the refractive index of the inorganic particles increases with temperature.

Thus, the inorganic particles having a maximum length of 30 nanometers or less are dispersed in the resin (e.g., plastic material as a base material). This arrangement provides the plastic material with its refractive index minimally dependent on the temperature. For example, when niobium oxide ($Nb_2O_5$) is dispersed in acryl, the change in refractive index due to temperature change can be reduced. Thus, inorganic particles are mixed in the plastic material to suppress the change in refractive index due to the temperature change in the lens section. This arrangement ensures that the impact of changes in the shape of the surface of the lens section upon the paraxial image point is almost equal to the impact of changes in refractive index due to the temperature change in the lens section upon the paraxial image point. This reduces the possibility of the lens falling out of focus due to temperature changes. If the maximum length is more preferably 20 nanometers or less, still more preferably 10 nanometers or less, light-scattering due to nanometer-level particles can be reduced to a negligible level.

The Japanese Unexamined Patent Application Publication No. 2007-126636 discloses the material with low dependency of the refractive index on temperature wherein nano-composites are used. Defocusing can be effectively corrected if such a technique is employed in the imaging lens LN of the present invention, and the 1st lens L1 (or 3rd lens L3) is made of the resin material having the dependency of refractive index on temperature to the extent appropriate to offset the impact on the paraxial image point due to a reduction in the paraxial radius of the 1st lens L1 (or and 3rd lens L3) resulting from the difference in the linear expansion coefficients of the 2nd lens L2, and 1st lens L1 (or 3rd lens L3).

When the lens unit LU is configured with the cemented lens as described above, the imaging lens LN can be produced, for example, by the reflow method or replica method. In the reflow method, glass film formation of low softening point is performed by the CVD (chemical vapor deposition) process, microfabrication is performed by photolithography and dry etching, and glass reflow is conducted by thermal treatment. This allows a plurality of lenses (1st lens L1 and 3rd lens L3) to be fanned simultaneously on the glass substrate (2nd lens L2). In the replica method, a curable resin is used to transfer a great number of lens configurations simultaneously on the lens wafer. This enables simultaneous production of a great number of lenses. Any one of these methods provides simultaneous production of a great number of lenses, and hence reduces production costs.

Figure 26:
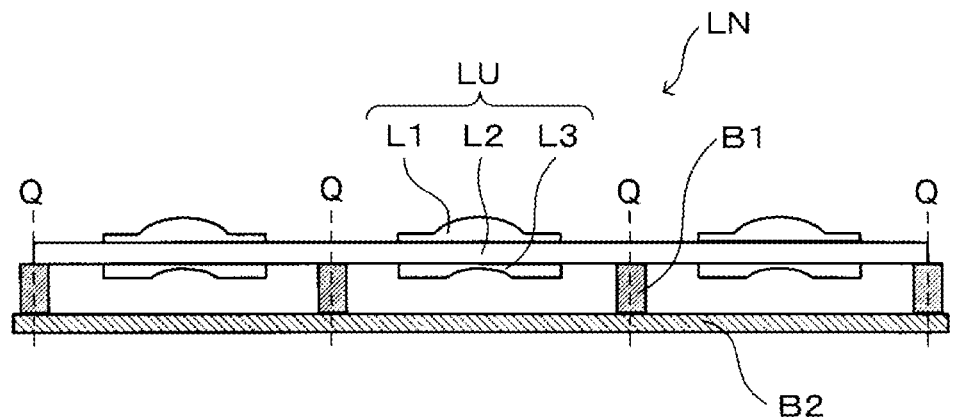
FIG. 26 is a cross section showing a method for manufacturing an imaging lens.

FIG. 26 is a cross sectional view representing another method for manufacturing the imaging lens LN. The imaging lens LN of the present invention is produced by the following methods: A plurality of imaging lenses LN are manufactured by the production method including the process of forming a plurality of lens sections (1st lens L1 and 3rd lens L3) on the parallel plane plate (2nd lens L2); the process of sealing the parallel plane plate and another substrate B2 through the grid-like spacer member B1; and the process of cutting the integral parallel plane plate, substrate B2 and spacer member B1 along the grid of the spacer member B1.

The grid-like spacer member B1 defines the space interval between the parallel plane plate and substrate 132, and keeps it at a predetermined value. The lenses (1st lens L1, 2nd lens L1 and 3rd lens L3) are arranged in the hole of the grid of the spacer member B1. The substrate B2 faces the parallel plane surface plate PT (FIG. 8), and is composed of a sensor chip-sized package at wafer level including the micro-lens eyes, a sensor cover glass and an infrared cut filter.

As described above, a plurality of lens sections are formed simultaneously on the parallel plane plate, and the parallel plane plate and substrate B2 are integrated via the spacer member B1. This is followed by the step of cutting off along the grid of the spacer member B1, whereby a great number of imaging lenses LN of the present invention can be obtained simultaneously at a reduced cost.

In the image pickup device ID of the referential forms 4 through 7, the lens unit LU of the imaging lens LN is made of the cemented lens including two lens sections. The lens section on the object side is a positive lens Lp and that on the image side is a negative lens Ln. Assume that the Abbe's number of the positive lens is $\nu 1$, and that of the negative lens is $\nu 2$. Then the following conditional expression (2) is preferably satisfied:

$$15 \leq |\nu 1 - \nu 2| \leq 70 \quad (2)$$

If the lower limit of the conditional expression (2) cannot be reached, chromatic aberration cannot be correctly easily and the performance of the MTF will be deteriorated. The combination of materials exceeding the upper limit of the conditional expression (2) will difficult in practice. Thus, when the Abbe's numbers $\nu 1$ and $\nu 2$ of the positive lens Lp and negative lens Ln are assigned to meet the conditional expression (2), the positive lens Lp and negative lens Ln are formed by using a proper material, whereby the lenses are achromatized. Particularly when both the positive lens Lp and negative lens Ln are made of resin, the material combination is restricted. The following conditional expression (2a) is preferably satisfied in order to achromatize the lens:

$$15 \leq |\nu 1 - \nu 2| \leq 40 \quad (2a)$$

In the image pickup device ID of the referential form 1, the imaging lens LN includes, from the object side, an aperture stop ST and a lens unit LU. The lens unit LU is formed of a meniscus lens convex toward the object. An imaging lens LN characterized by compact configuration and excellent aberration performances can be provided by a simplest structure wherein the lens unit LU is formed of one meniscus lens, as described above.

In the image pickup devices ID of the referential forms 3, 5 through 7 and embodiments 8 through 12, the imaging lens LN is provided with a parallel plane surface plate PT, which is arranged on the image side of the lens unit LU.

It is commonly known that, when the image side surface of the imaging lens LN is concave toward the image side, the peripheral light flux is diverged by the negative power of the image side surface, and the positive distortion is provided. When the parallel plane surface plate PT is arranged on the side further closer to the image, of the lens unit LU concave toward the image, as in the present invention, negative distortion can be produced by the thickness of the parallel plane surface plate PT, so as to offset the positive distortion produced by the lens surface having a negative power. To be more specific, excellent aberration performances can be provided by a simplest structure wherein the parallel plane surface plate PT is arranged on the image side of the lens unit LU.

Assume that Dg (mm) denotes the thickness of the parallel plane surface plate PT and f (mm) indicates the focal length of the entire system. Under this assumption, the following conditional expression (3) is preferably satisfied:

$$0.1 \leq Dg/f < 1.0 \tag{3}$$

The conditional expression (3) defines the proper range of the thickness of the parallel plane surface plate PT. To be more specific, if the lower limit of the conditional expression (3) is not satisfied, occurrence of the negative aberration is reduced. This will reduce the ability of the parallel plane surface plate PT to correct the positive distortion caused by the lens surface having a negative power. In the meantime, if the upper limit of the conditional expression (3) is not satisfied, the light beam goes in the medium in the most portion of the lens system, and the overall optical length is longer. Thus, when the conditional expression (3) is satisfied, the optical system can be formed into a compact structure while the excellent aberration correcting function is maintained.

The following conditional expression (3a) is more preferably satisfied, and the conditional expression (3b) is still more preferably satisfied:

$$0.2 \leq Dg/f < 1.0 \tag{3a}$$

$$0.35 \leq Dg/f < 1.0 \tag{3b}$$

The number of the aforementioned parallel plane plates PT can be one or more. If a plurality of parallel plane plates PT are used, the total of respective thicknesses can be used as the total of the parallel plane surface plate PT. The plane plate (infrared cut filter) and others arranged to cut off the infrared ray can be used as the parallel plane surface plate PT.

Figure 1:
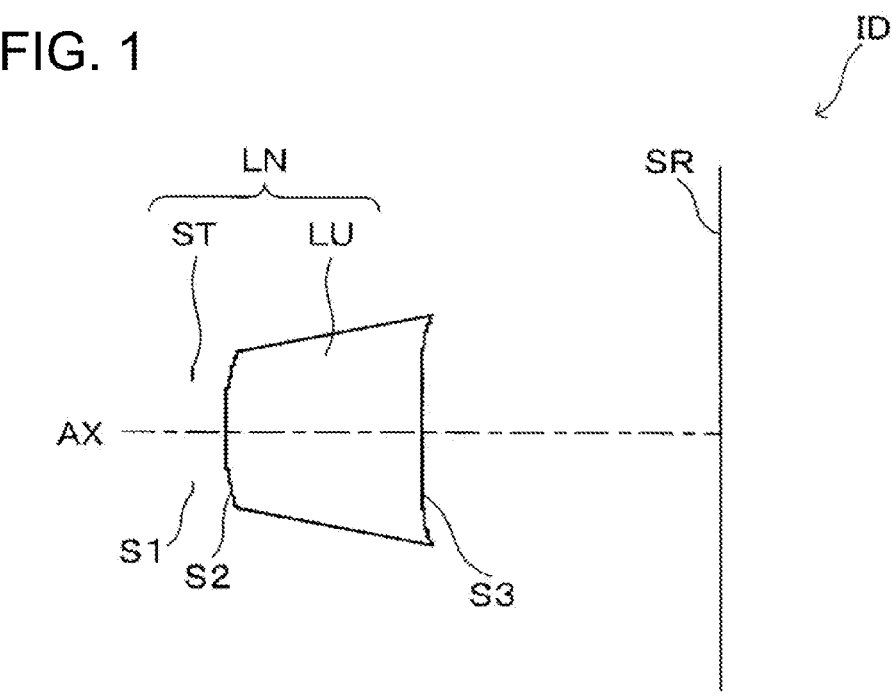
FIG. 1 is a cross section showing a schematic configuration of an image pickup device according to a referential form 1.
Figure 2:
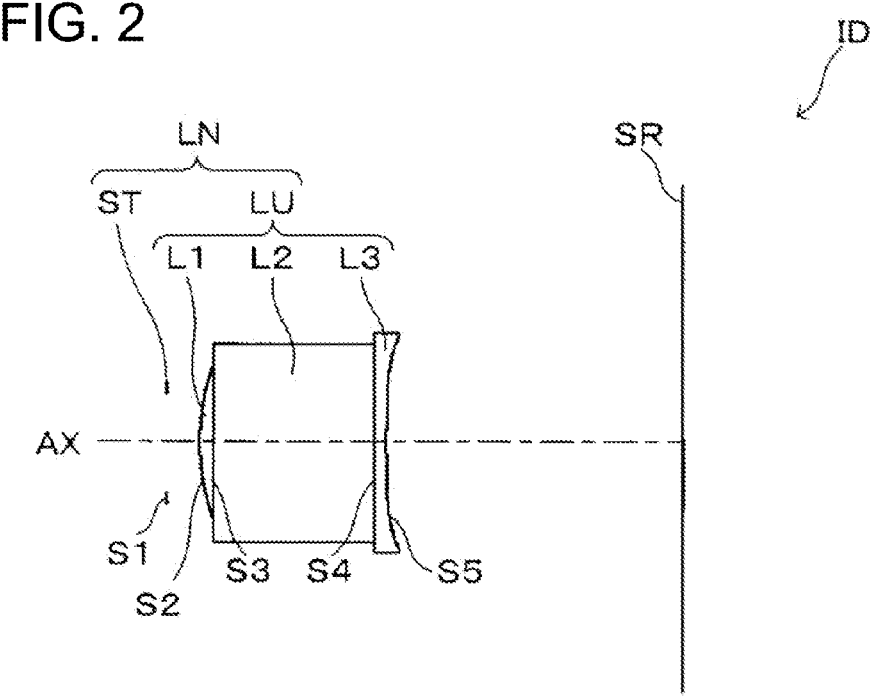
FIG. 2 is a cross section showing a schematic configuration of an image pickup device according to an embodiment 2 of the present invention.
Figure 3:
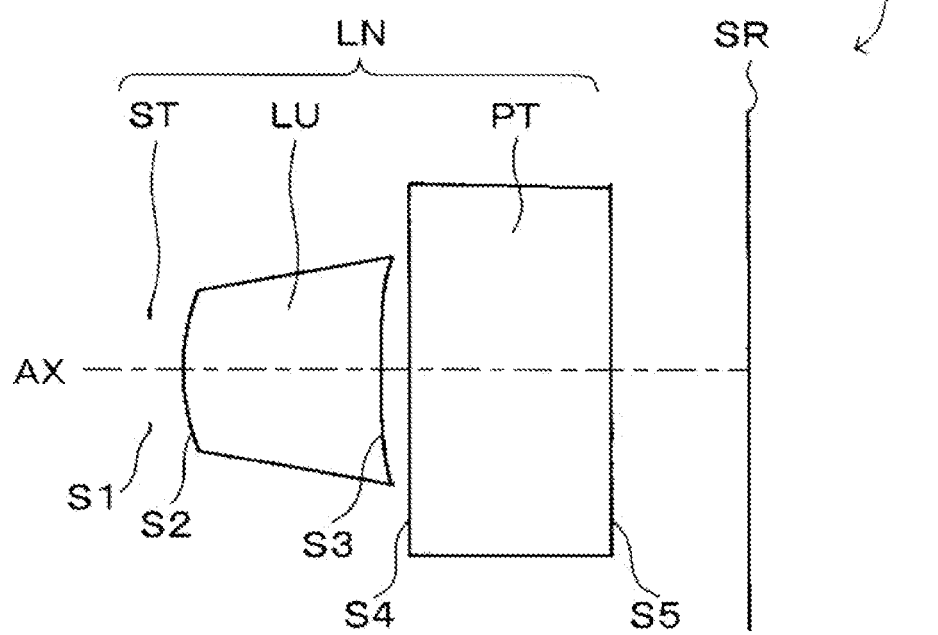
FIG. 3 is a cross section showing a schematic configuration of an image pickup device according to a referential form 3.
Figure 4:
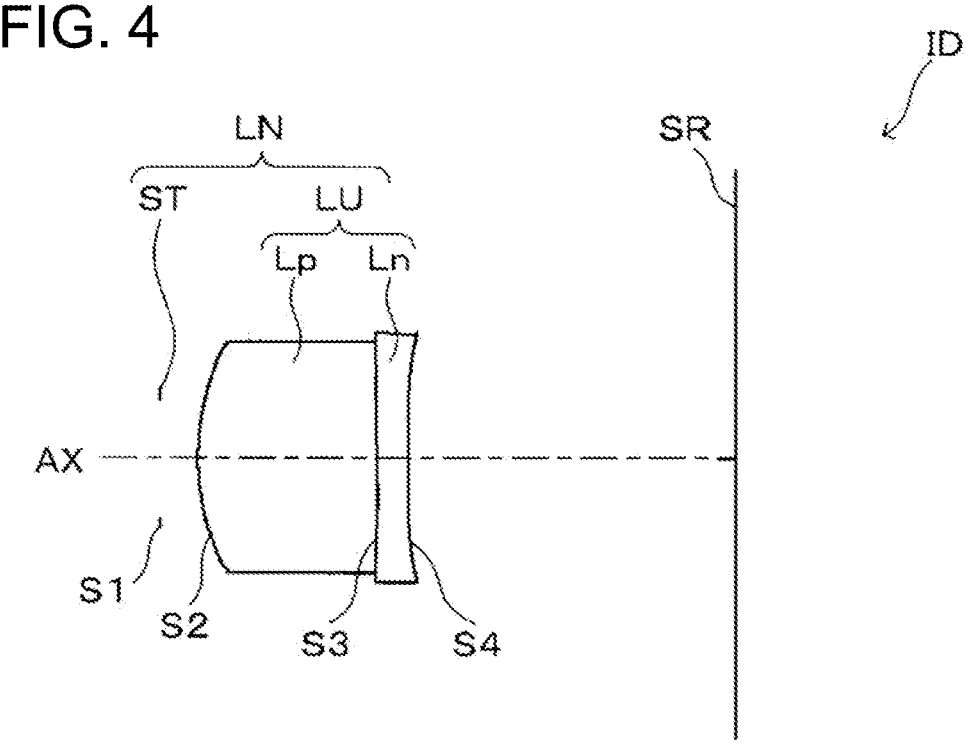
FIG. 4 is a cross section showing a schematic configuration of an image pickup device according to a referential form 4.
Figure 5:
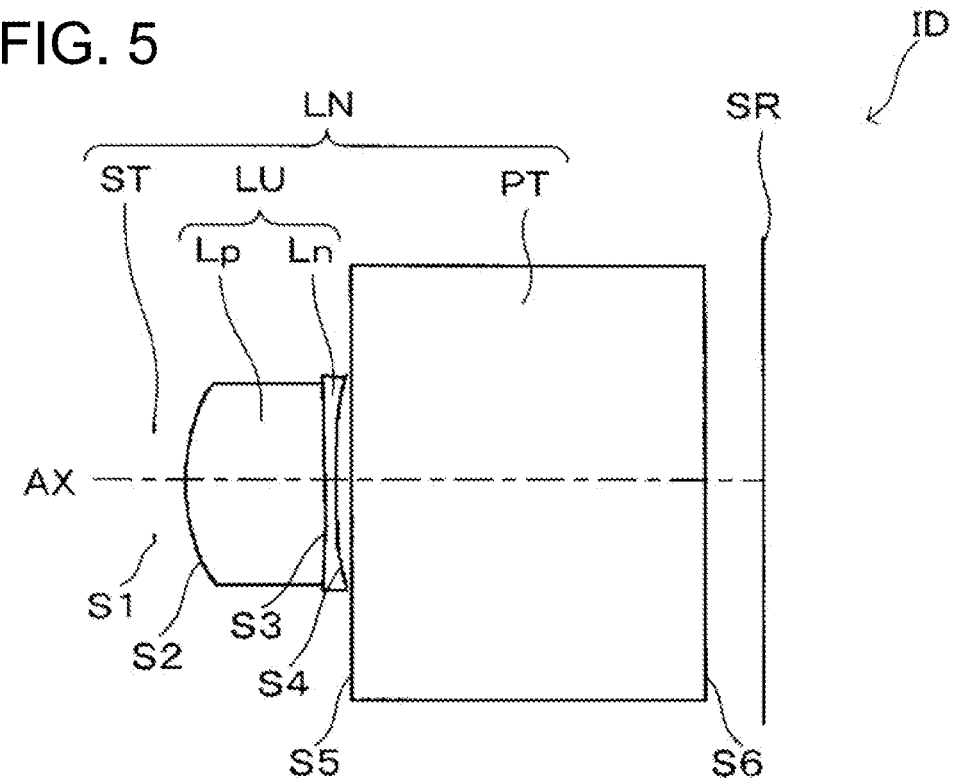
FIG. 5 is a cross section showing a schematic configuration of an image pickup device according to a referential form 5.
Figure 6:
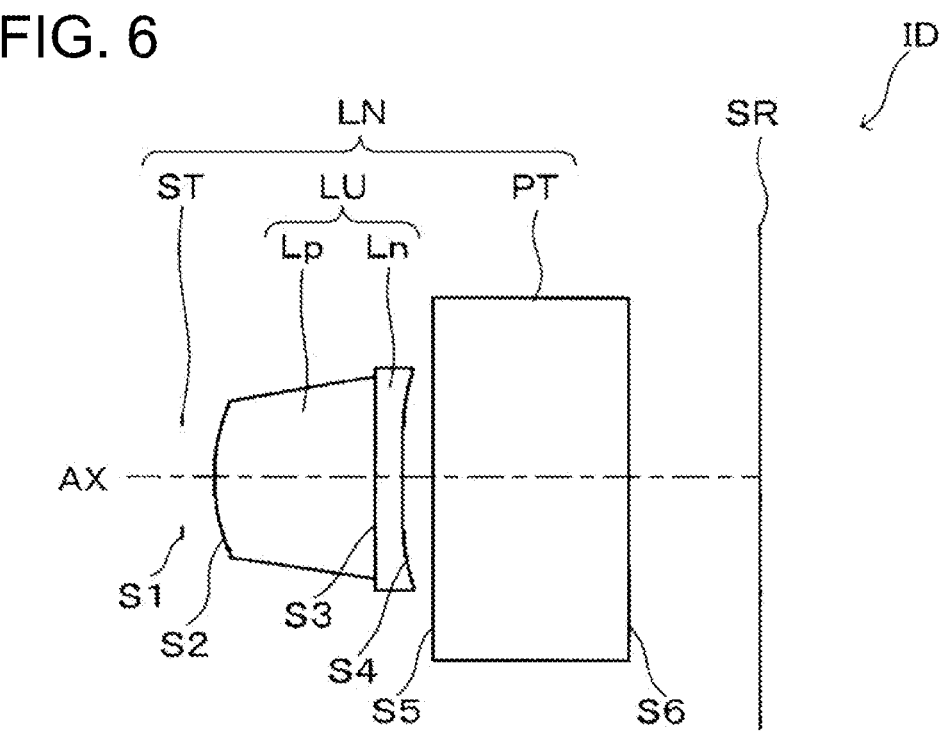
FIG. 6 is a cross section showing a schematic configuration of an image pickup device according to a referential form 6.
Figure 7:
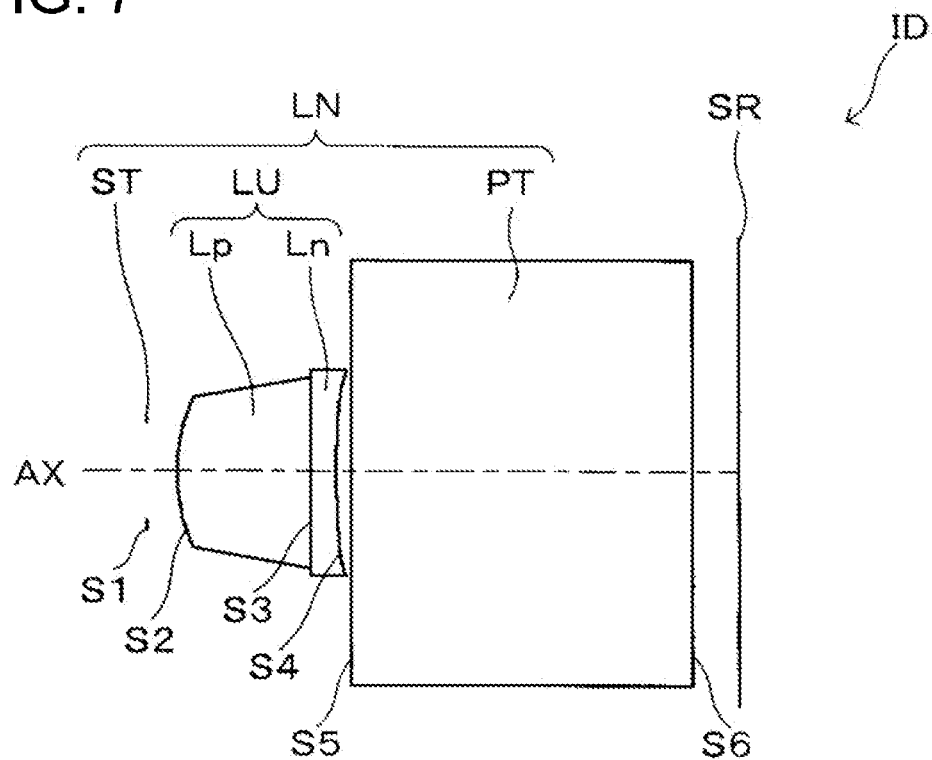
FIG. 7 is a cross section showing a schematic configuration of an image pickup device according to a referential form 7.
Figure 8:
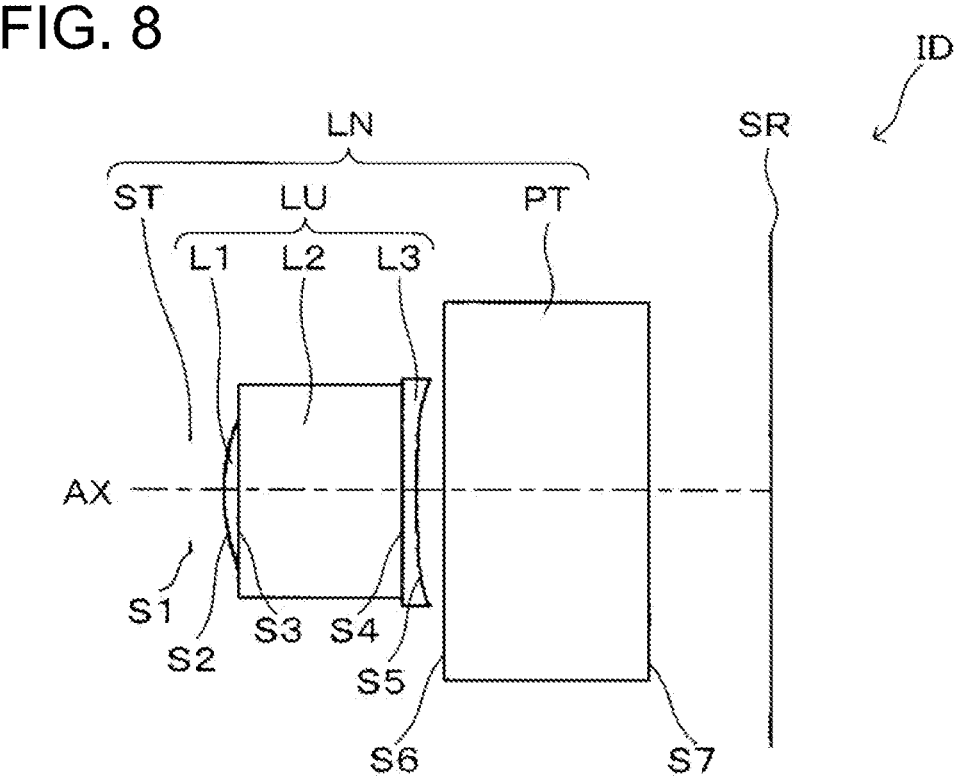
FIG. 8 is a cross section showing a schematic configuration of an image pickup device according to an embodiment 8 of the present invention.
Figure 9:
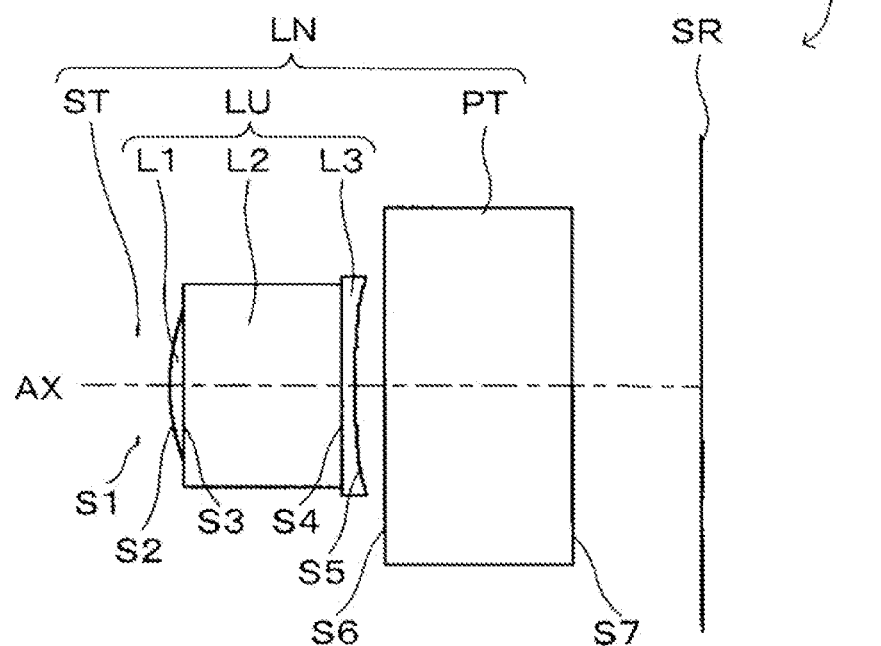
FIG. 9 is a cross section showing a schematic configuration of an image pickup device according to an embodiment 9 of the present invention.
Figure 10:
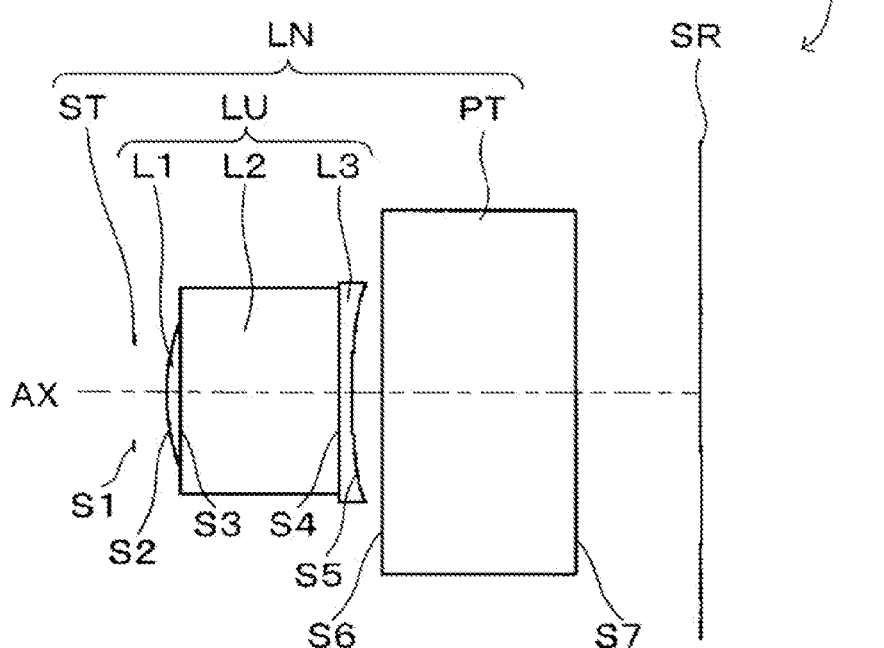
FIG. 10 is a cross section showing a schematic configuration of an image pickup device according to an embodiment 10 of the present invention.
Figure 11:
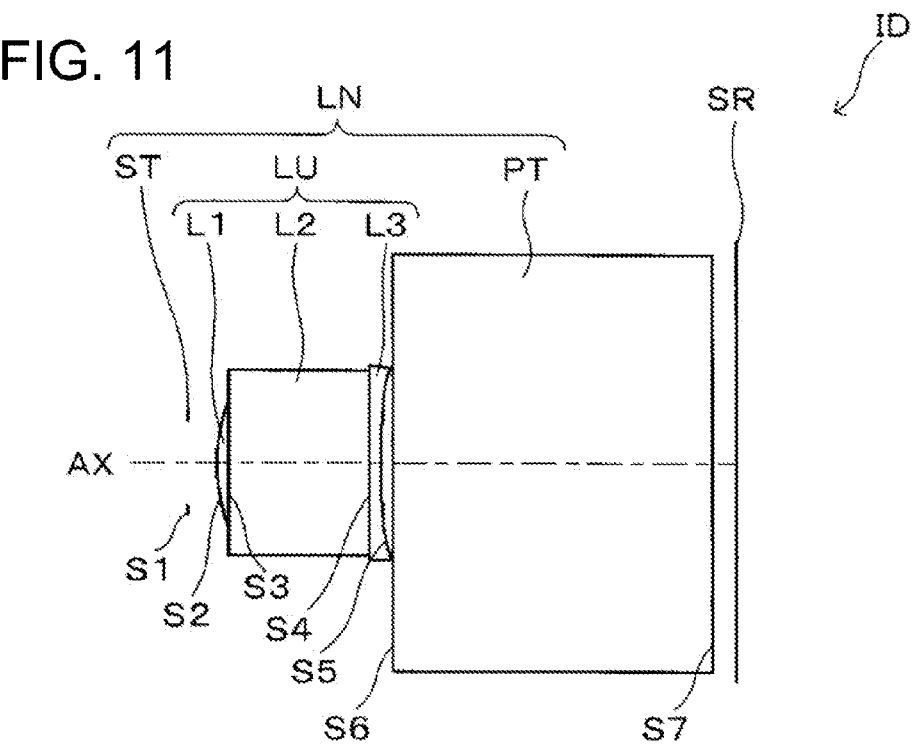
FIG. 11 is a cross section showing a schematic configuration of an image pickup device according to an embodiment 11 of the present invention.
Figure 12:
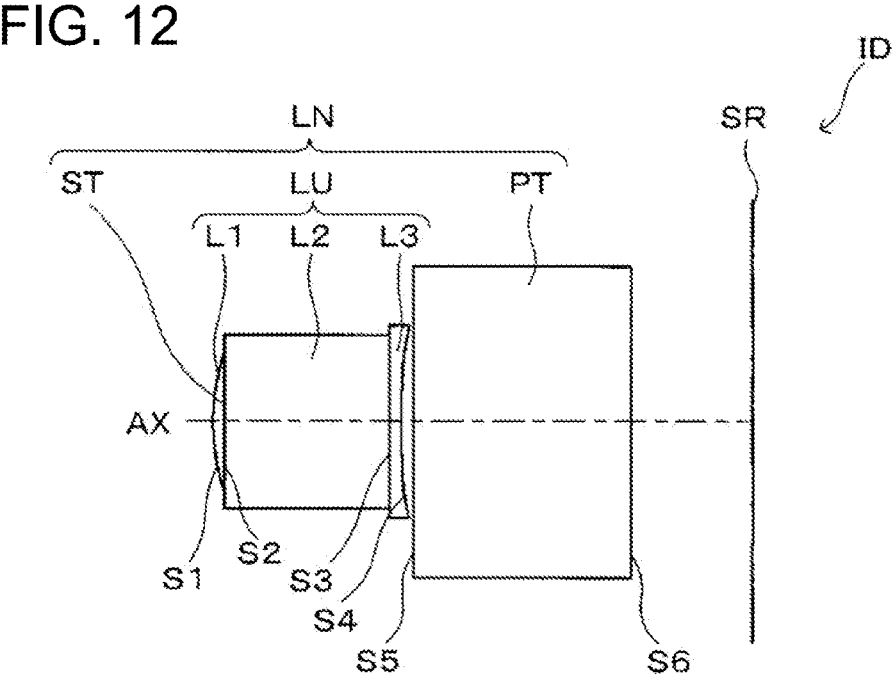
FIG. 12 is a cross section showing a schematic configuration of an image pickup device according to an embodiment 12 of the present invention.
Figure 13:
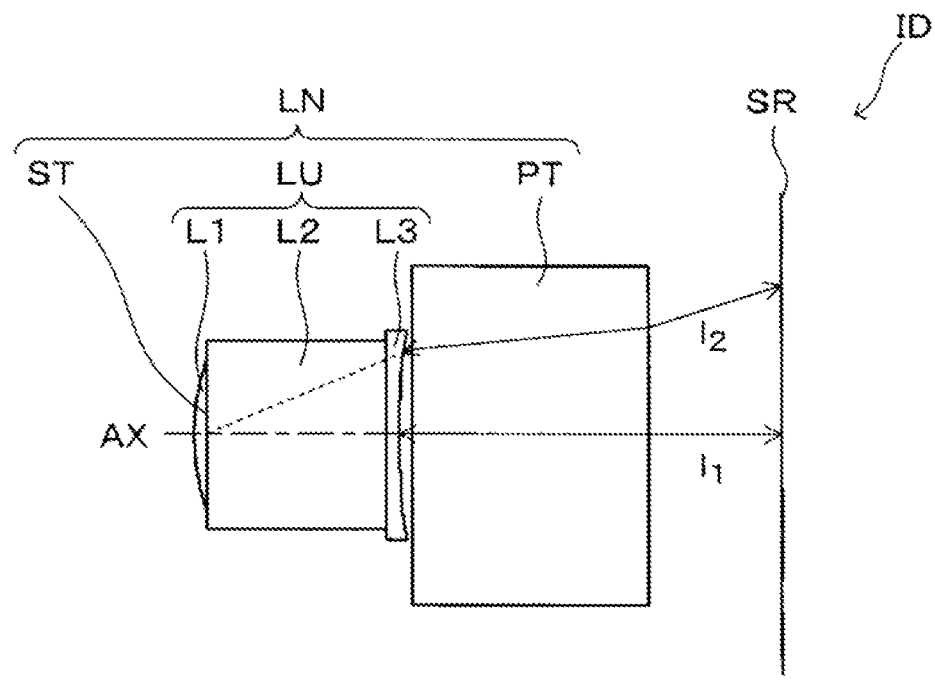
FIG. 13 is an explanation diagram showing an optical path length of each of an axial ray and a principal ray at the maximum image height of the image pickup device according to the embodiment 12.

The parallel plane surface plate PT preferably satisfies the following conditional expression (4):

$$(l_2 - l_1)/f < 0.14 \tag{4}$$

wherein:

$l_1$: Length (mm) of the optical path of the axial ray from the image side surface of lens unit to the image surface $l_2$: Length (mm) of the optical path for the principal ray at the maximum image height from the image side surface of lens unit to the image surface f: Focal length (mm) for the entire system FIG. 13 shows the aforementioned optical paths $l_1$ and $l_2$ in the image pickup device ID of the embodiment 12.

When the parallel plane surface plate PT satisfying the conditional expression (4) is arranged at the position closest to the image, the parallel plane surface plate PT will be provided with the function of reducing the optical paths $l_1$ and $l_2$ for the axial ray and the principal ray of the maximum image height. To be more specific, the distance to the image surface is reduced according to the Snell's law. This signifies that the distortion is reduced by refraction. To put it other words, when the upper limit of the conditional expression (4) is not satisfied, the distortion correction capacity is small or the distortion caused by the imaging lens LN is large. This is not preferred.

In the lens unit LU of the image pickup device ID in each of the referential forms and embodiments, at least one of the surfaces having power and being in contact with air is preferably aspherical. In the lens unit LU, the difference in the refractive index of the medium is the greatest on the surface in contact with air (boundary surface with air). Accordingly, when such a surface is aspherical, the advantage of aspherical surface (the effect of aberration correction) can be most effectively utilized.

The aforementioned imaging lens LN of the referential forms and embodiments is suited for use in the digital equipment (e.g., portable terminal) with image input function.

Thus, the imaging lens LN used in combination with the image sensor SR and other provides the aforementioned image pickup device ID wherein the image of a subject is optically captured and is outputted as electric signal. The image pickup device ID is an optical device as the major component of the camera used to photograph still images or moving images of a subject.

The examples of the camera include a digital camera, video camera, monitoring camera, onboard camera, and TV phone camera, as well as the cameras built inside or outside a personal computer, portable terminal (e.g., a small-sized portable information equipment terminal such as cellular mobile phone and mobile computer), peripheral equipment thereof (e.g., scanner and printer) and other digital equipment. As can be seen from these examples, a camera can be configured by use of the image pickup device ID. Not only that, when the image pickup device ID is mounted on each piece of equipment, a camera function can be added. For example, it is possible to configure a digital device equipped with an image input function as exemplified by a camera-equipped cellular mobile phone.

FIG. 27 is an explanatory diagram representing the approximate configuration of portable terminal CU as an example of the digital device equipped with image input function. The portable terminal CU is provided with a signal processing section 1, control section 2, memory 3, operation section 4 and display section 5 in addition to the aforementioned image pickup device ID.

In the image pickup device ID, the optical image IM formed on the light receiving surface SS by the imaging lens LN is converted into an electric signal by the image sensor SR and is outputted. The output signal from the image sensor SR is inputted into the signal processing section 1, wherein the signal is subjected to digital image processing, image compression processing and other required processing, and is recorded in the memory 3 (such as a semiconductor memory and optical disk) as a digital video signal. Further, the aforementioned video signal is transmitted to other equipment by a cable or after having been converted into the infrared signal, as the case may be.

The control section 2 includes a micro-computer and provides control of such functions as a photographing function and image reproducing function, control of the lens moving mechanism for focusing, and control of various sections. For example, the image pickup device ID is controlled by the control section 2 to ensure that at least one of still image photographing and moving image photographing of a subject can be performed.

The operation section 4 includes the operation members such as the operation buttons (e.g., release button) and operation dials (e.g., photographic mode dial). The operation section 4 is used to send to the control section 2 the information operated and inputted by the operator. The display section 5 includes a display such as a liquid crystal monitor. The display section 5 displays an image by using the image signal converted by the image sensor SR or the image information stored in the memory 3.

The optical image to be formed by the imaging lens LN passes through the optical low-pass filter (parallel plane surface plate PT of FIG. 27) having a predetermined cutoff frequency characteristic depending on the pixel pitch of the image sensor SR, for example. In this case, the spatial frequency characteristic is adjusted to minimize so-called an aliasing noise produced at the time of conversion into an electric signal by the image sensor SR. This arrangement suppresses occurrence of a chromatic moire pattern.

If the performance near the maximum resolution frequency is suppressed, there is no concern about the possibility of noise production without using the optical low-pass filter. Further, there is no need for using a low-pass filter when the user takes a photograph or enjoys viewing a photograph, using a display system wherein noise is not very conspicuous (e.g., liquid crystal screen of a cellular mobile phone).

When the image pickup device ID is used to configure a portable terminal CU with image input function, the image pickup device ID is generally placed inside the body thereof. When implementing the camera function, it is possible to adopt a form compatible with the current requirements. For example, a unitized image pickup device ID can be configured so as to be mounted on or dismounted from the main body of the portable terminal CU.

EXAMPLE

Referring to the construction data, a specific configuration of the imaging lenses LN of the referential forms 1, 3 through 7 and embodiments 2, 8 through 12 will be described as the referential examples 1, 3 through 7 and examples 2, 8 through 12. The referential examples 1, 3 through 7 and examples 2, 8 through 12 are the numerical examples corresponding to the aforementioned referential forms 1, 3 through 7 and embodiments 2, 8 through 12. The optical configuration diagrams (FIGS. 1, 3 through 7 and FIGS. 2, 8 through 12) of the referential forms 1, 3 through 7 and embodiments 2, 8 through 12 each represent the lens configurations of the referential examples 1, 3 through 7 and examples 2, 8 through 12.

The construction data of the referential examples and examples represents the surface number Si, radius r (mm), on-axis surface interval d (mm), refractive index nd at the d-line, and Abbe number vd at the d-line in order from the leftmost column. The surface number Si denotes the i-th position from the object side. The surface assigned with surface number Si affixed with "*" is aspherical, and can be defined by the following equation (AS) using the local orthogonal coordinates (x, y and z) wherein the vertex of surface is assumed as an origin. In the aspherical surface of each of referential examples and examples, the coefficient without any notation indicates 0 (zero), and $E-n = \times 10^{-n}$ for all data.

$$z = \frac{(c \cdot h^2)}{[1 + \sqrt{[1-(1+K) \cdot c^2 \cdot h^2]}]} + A \cdot h^4 + B \cdot h^6 + C \cdot h^8 + D \cdot h^{10} + E \cdot h^{12} + F \cdot h^{14} + G \cdot h^{16} + H \cdot h^{18} + J \cdot h^{20} \quad (AS)$$

wherein h: Height ($h^2 = x^2 + y^2$) perpendicular to the z-axis (optical axis AX)

z: Sag in the direction of optical axis AX at height h (with respect to the vertex of surface)

c: Curvature at vertex of surface (reciprocal of radius r)

K: Conical constant

A, B, C, D, E, F, G, H, J: aspherical coefficients of 4th order, 6th order, 8th order, 10th order, 12th order, 14th order, 16th order, 18th order, and 20th order FIGS. 14 through 25 show aberrations in the referential examples and examples 1 through 12. These diagrams are a spherical aberration diagram (LONGITUDINAL SPHERICAL ABER.), astigmatism diagram (ASTIGMATIC FIELD CURVES) and distortion diagram (DISTORTION) in that order from the left. In the spherical aberration diagrams, the spherical aberration for the d-line indicated by a solid line (wavelength: 587.56 nm), the spherical aberration for the C-line indicated by a broken line (wavelength: 656.28 nm) and the spherical aberration for the C-line indicated by a one-dot chain line (wavelength: 435.84 nm) each are represented in terms of the deviations from the paraxial image surface (unit: mm, horizontal scale: −0.200 through 0.200 mm) in the direction of optical axis. The vertical axis represents the value (i.e., relative height of pupils) obtained by normalizing the incident height to the pupils normalized by the maximum height thereof.

In the astigmatism diagram, the broken line T shows the tangential image surface with respect to the d-line, and the solid line S indicates the sagittal image surface with respect to d-line in terms of deviations from the paraxial image surface (unit: mm, horizontal scale: −0.20 through 0.20 mm) in the direction of optical axis. The vertical axis represents the image height (IMG HT, unit: mm). In the distortion diagram, the horizontal axis indicates the distortion with respect to d-line (unit: %, horizontal scale: −10.0 through 10.0%) in the direction of optical axis. The vertical axis represents the image height (IMG HT, unit: mm). The image height (IMG HT) corresponds to the maximum image height Y (half the width of the diagonal of the light receiving surface SS of the image sensor SR) in the image forming surface.

Referential Example 1

Figure 14:
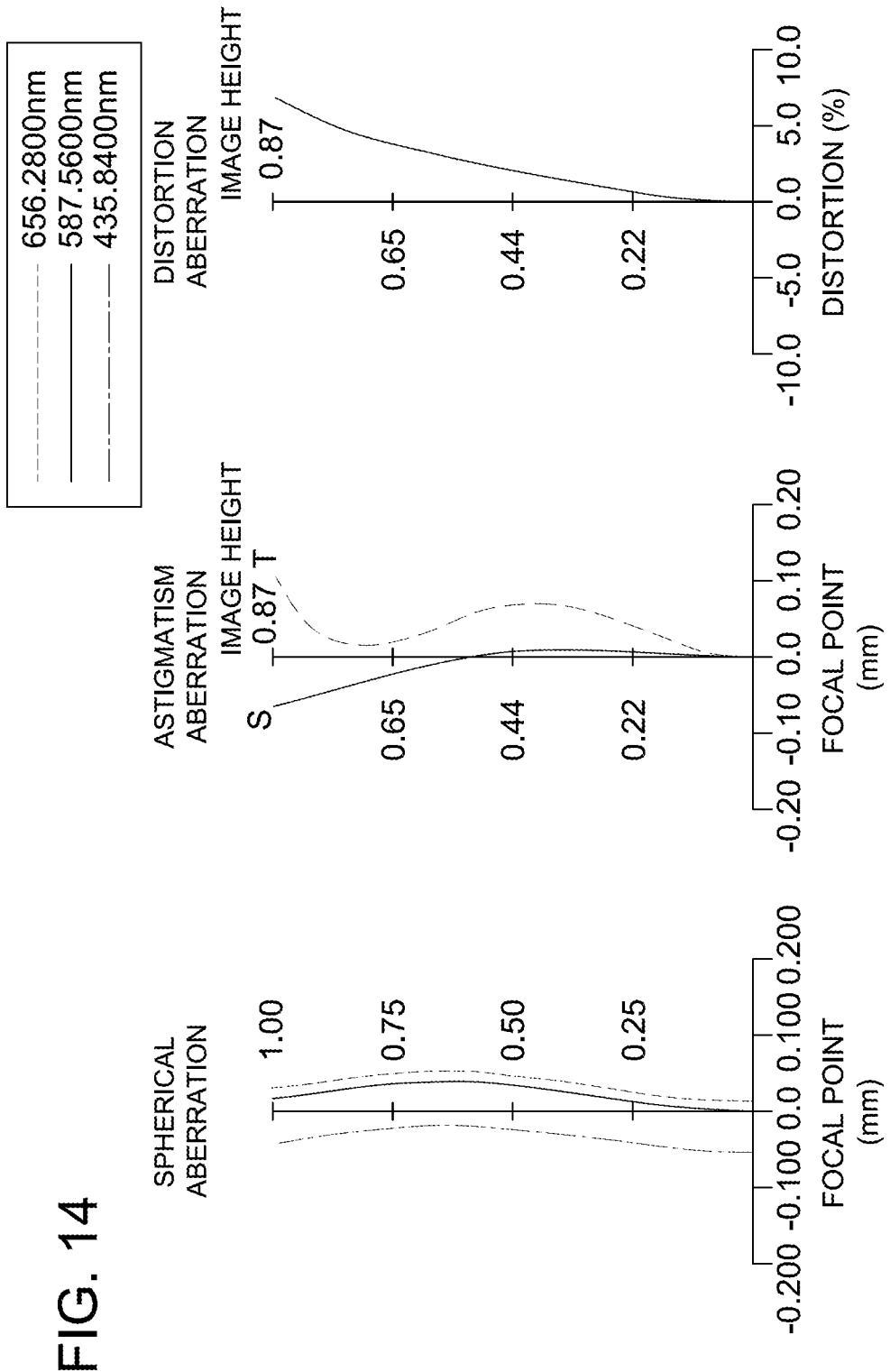
FIG. 14 is an explanation diagram showing different aberrations of an image pickup device of a referential example 1.

See FIG. 14

Unit: mm

<Surface data>

| Si: | r | d | n | vd |
|---|---|---|---|---|
| 1 (aperture stop): | ∞ | 0.116 | | |
| 2*: | 0.802 | 0.670 | 1.57370 | 29.00 |
| 3*: | 24.486 | 1.096 | | |

<Aspherical data>

Surface S2

K = −8.98E−01,
A = −7.12E−01, B = 5.05E+01, C = −7.35E+02, D = 3.55E+03,
E = 0.00E+00, F = 0.00E+00, G = 0.00E+00, H = 0.00E+00,
J = 0.00E+00

Surface S3

K = −2.47E+03,
A = 2.47E+00, B = −1.88E+01, C = 1.34E+02, D = −3.21E+02,
E = 0.00E+00, F = 0.00E+00, G = 0.00E+00, H = 0.00E+00,
J = 0.00E+00

Example 2

Figure 15:
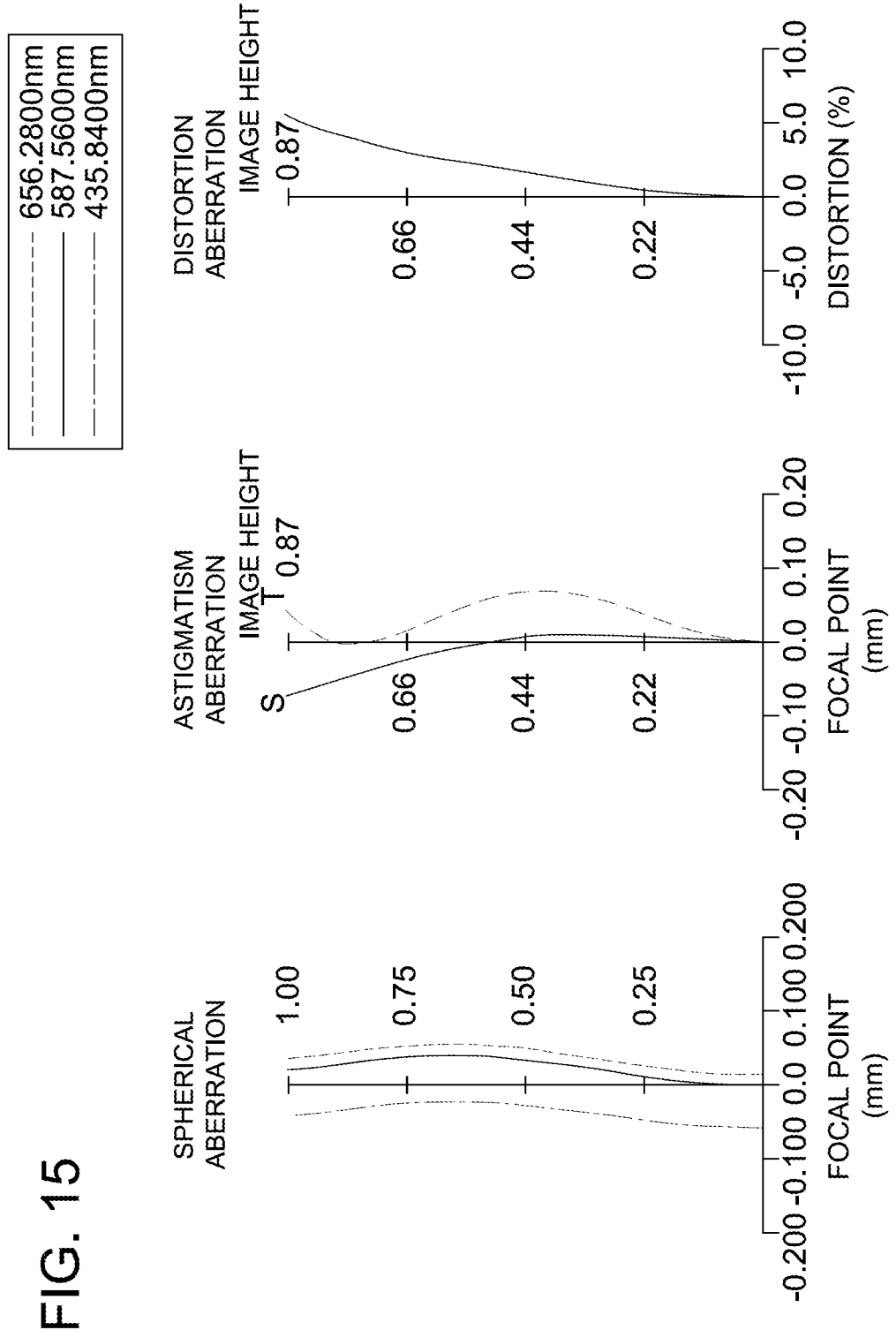
FIG. 15 is an explanation diagram showing different aberrations of an image pickup device of an example 2.

See FIG. 15

Unit: mm

<Surface data>

| Si: | r | d | n | vd |
|---|---|---|---|---|

-continued

| Unit: mm | | | | |
|---|---|---|---|---|
| 1 (aperture stop): | ∞ | 0.116 | | |
| 2*: | 0.700 | 0.050 | 1.57370 | 29.00 |
| 3: | ∞ | 0.570 | 1.67700 | 56.20 |
| 4: | ∞ | 0.050 | 1.57370 | 29.00 |
| 5*: | 24.486 | 1.020 | | |

<Aspherical data>

Surface S2

K = −8.98E−01,
A = −7.12E−01, B = 5.05E+01, C = −7.35E+02, D = 3.55E+03,
E = 0.00E+00, F = 0.00E+00, G = 0.00E+00, H = 0.00E+00,
J = 0.00E+00
Surface S5

K = −2.47E+03,
A = 2.47E+00, B = −1.88E+01, C = 1.34E+02, D = −3.21E+02,
E = 0.00E+00, F = 0.00E+00, G = 0.00E+00, H = 0.00E+00,
J = 0.00E+00

Referential example 3

Figure 16:
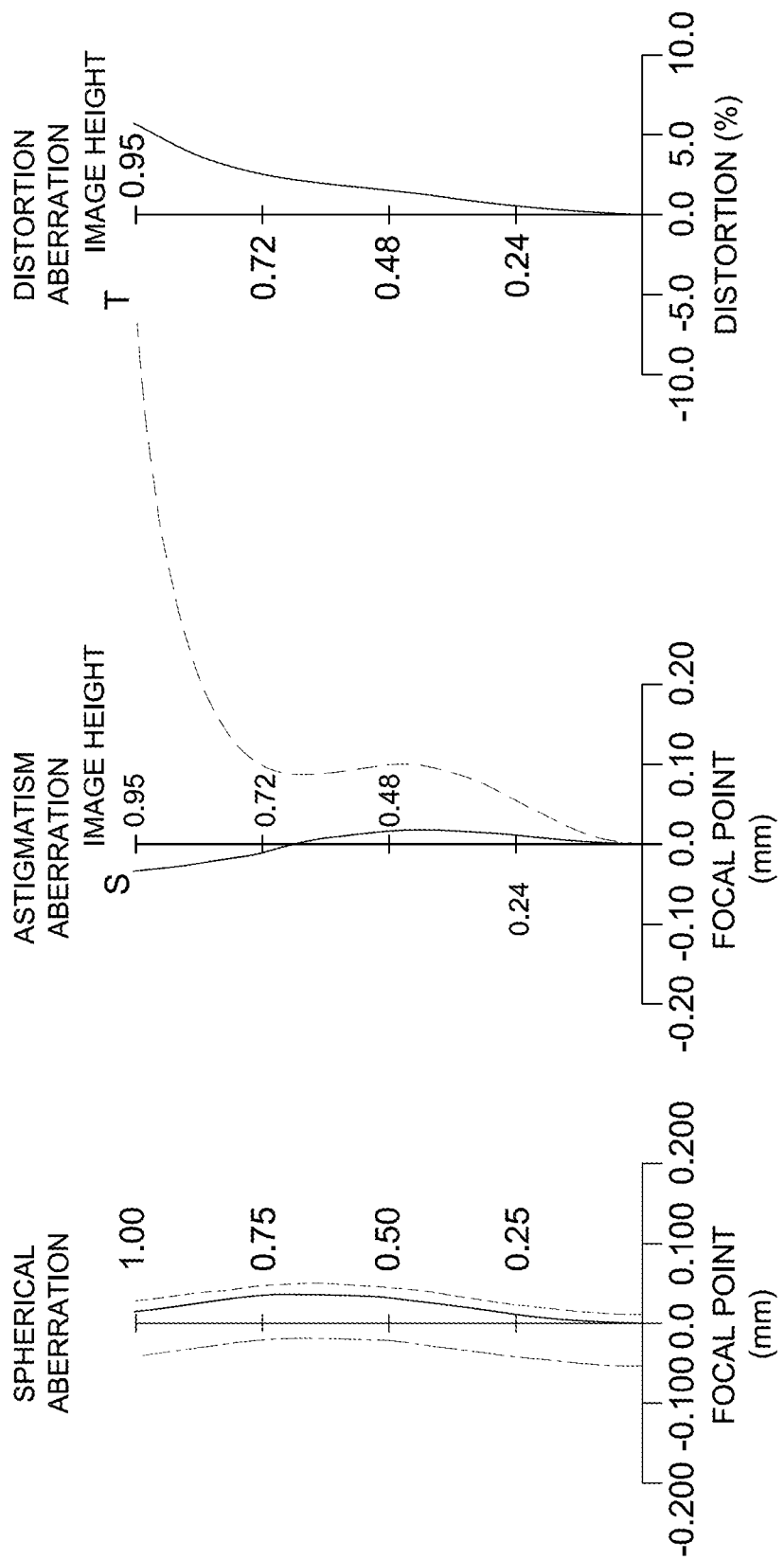
FIG. 16 is an explanation diagram showing different aberrations of an image pickup device of a referential example 3.

See FIG. 16

| Unit: mm | | | | |
|---|---|---|---|---|
| Si: | r | d | n | vd |
| 1 (aperture stop): | ∞ | 0.116 | | |
| 2*: | 0.802 | 0.670 | 1.57370 | 29.00 |
| 3*: | 24.486 | 0.100 | | |
| 4: | ∞ | 0.683 | 1.51633 | 64.10 |
| 5: | ∞ | 0.446 | | |

<Aspherical data>

Surface S2

K = −8.98E−01,
A = −7.12E−01, B = 5.05E+01, C = −7.35E+02, D = 3.55E+03,
E = 0.00E+00, F = 0.00E+00, G = 0.00E+00, H = 0.00E+00,
J = 0.00E+00
Surface S3

K = −2.47E+03,
A = 2.47E+00, B = −1.88E+01, C = 1.34E+02, D = −3.21E+02,
E = 0.00E+00, F = 0.00E+00, G = 0.00E+00, H = 0.00E+00,
J = 0.00E+00

Referential Example 4

Figure 17:
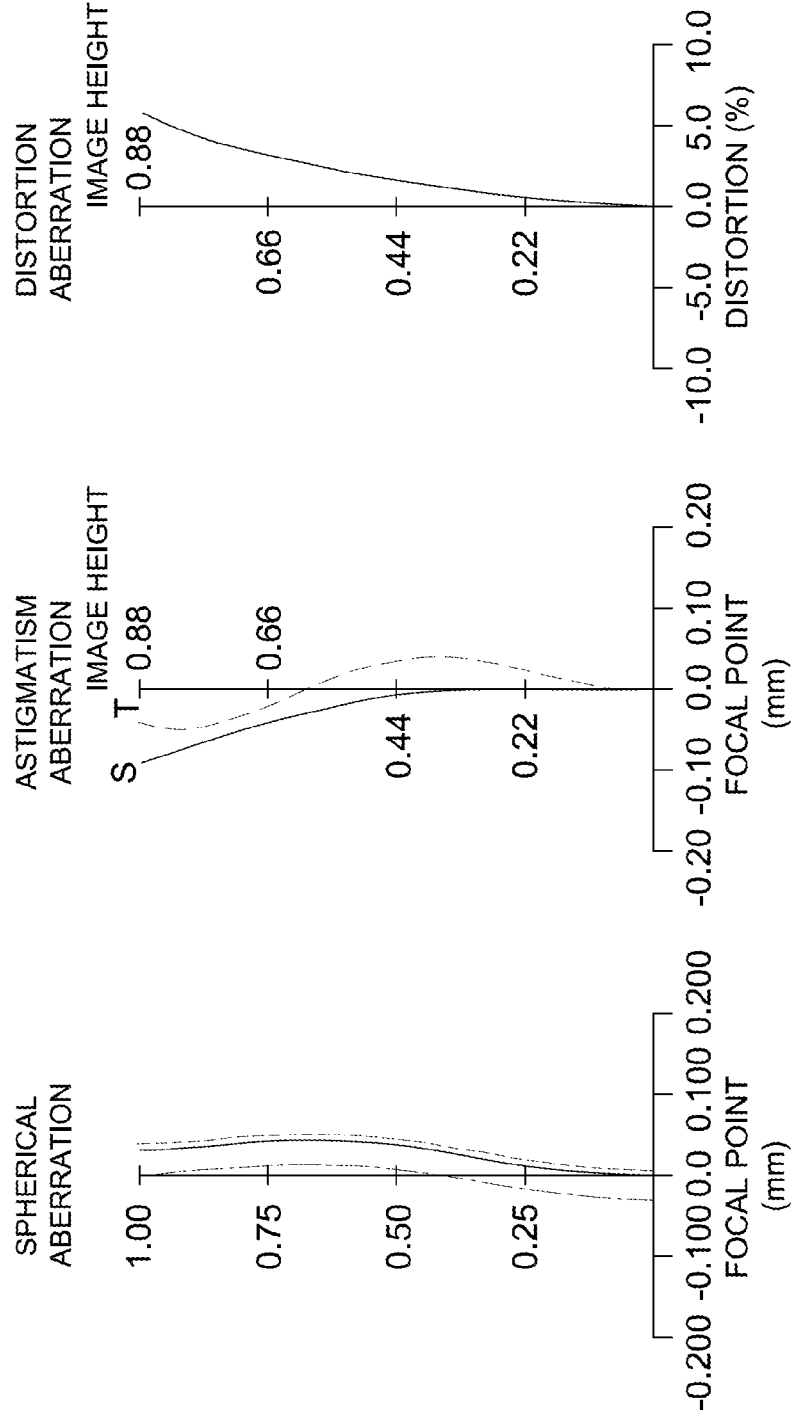
FIG. 17 is an explanation diagram showing different aberrations of an image pickup device of a referential example 4.

See FIG. 17

| Unit: mm | | | | |
|---|---|---|---|---|
| Si: | r | d | n | vd |
| 1 (aperture stop): | ∞ | 0.116 | | |
| 2*: | 0.740 | 0.570 | 1.50710 | 54.00 |
| 3: | −27.340 | 0.100 | 1.57370 | 29.00 |

-continued

| Unit: mm | | | | |
|---|---|---|---|---|
| 4*: | 24.486 | 1.089 | | |

<Aspherical data>

Surface S2

K = 5.00E+00,
A = −6.59E−01, B = 5.00E+01, C = −7.06E+02, D = 3.16E+03,
E = 0.00E+00, F = 0.00E+00, G = 0.00E+00, H = 0.00E+00,
J = 0.00E+00
Surface S4

K = 1.61E+02,
A = 1.88E+00, B = −1.16E+01, C = 7.90E+01, D = −1.84E+02,
E = 0.00E+00, F = 0.00E+00, G = 0.00E+00, H = 0.00E+00,
J = 0.00E+00

Referential Example 5

Figure 18:
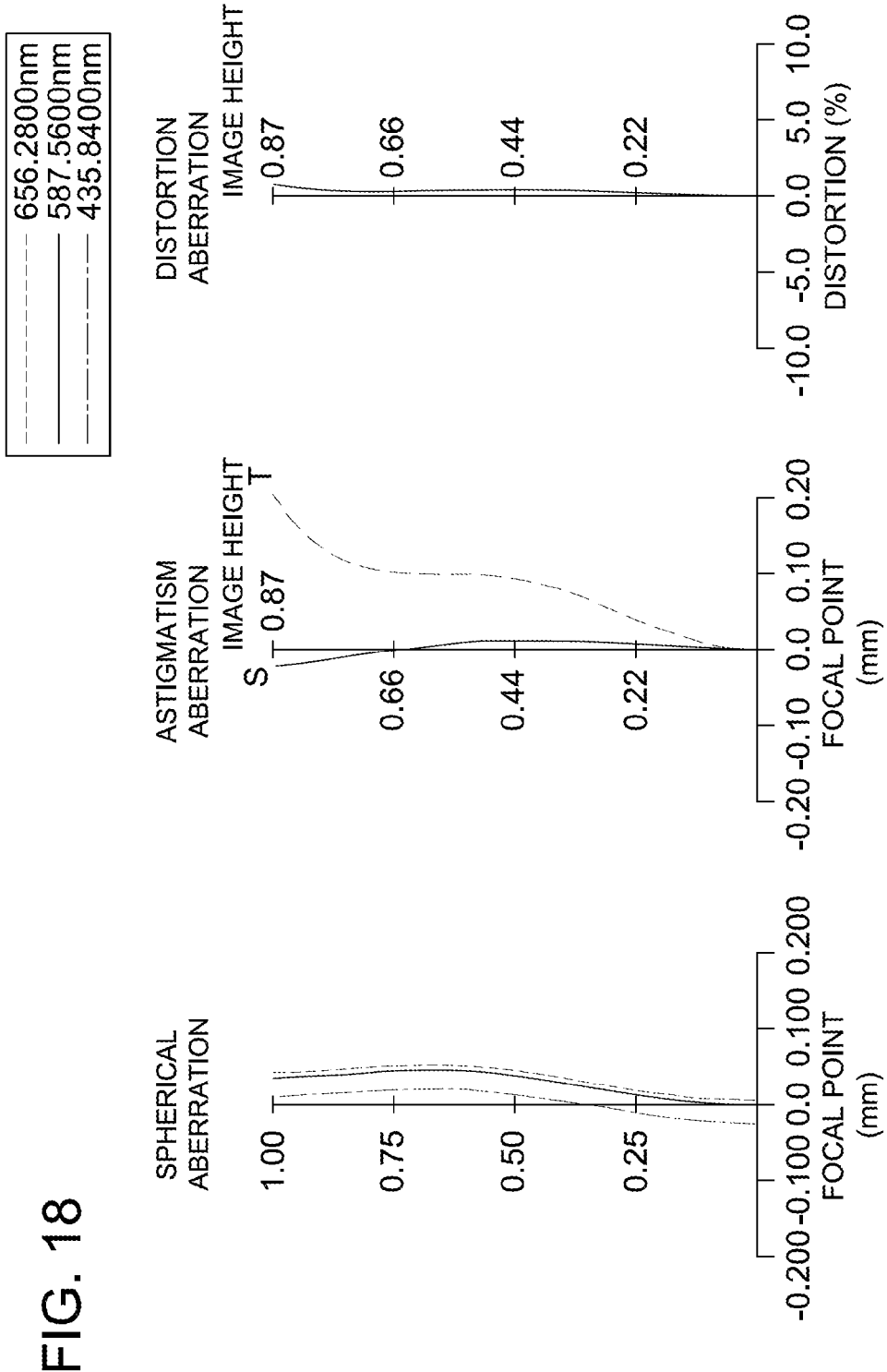
FIG. 18 is an explanation diagram showing different aberrations of an image pickup device of a referential example 5.

See FIG. 18

| Unit: mm | | | | |
|---|---|---|---|---|
| <Surface data> | | | | |
| Si: | r | d | n | vd |
| 1 (aperture stop): | ∞ | 0.116 | | |
| 2*: | 0.740 | 0.570 | 1.50710 | 54.00 |
| 3: | −27.340 | 0.100 | 1.57370 | 29.00 |
| 4*: | 24.486 | 0.050 | | |
| 5: | ∞ | 1.300 | 1.51633 | 64.10 |
| 6: | ∞ | 0.131 | | |

<Aspherical data>

Surface S2

K = −1.54E+00,
A = −6.59E−01, B = 5.00E+01, C = −7.06E+02, D = 3.16E+03,
E = 0.00E+00, F = 0.00E+00, G = 0.00E+00, H = 0.00E+00,
J = 0.00E+00
Surface S4

K = 1.61E+02,
A = 1.88E+00, B = −1.16E+01, C = 7.90E+01, D = −1.84E+02,
E = 0.00E+00, F = 0.00E+00, G = 0.00E+00, H = 0.00E+00,
J = 0.00E+00

Referential Example 6

Figure 19:
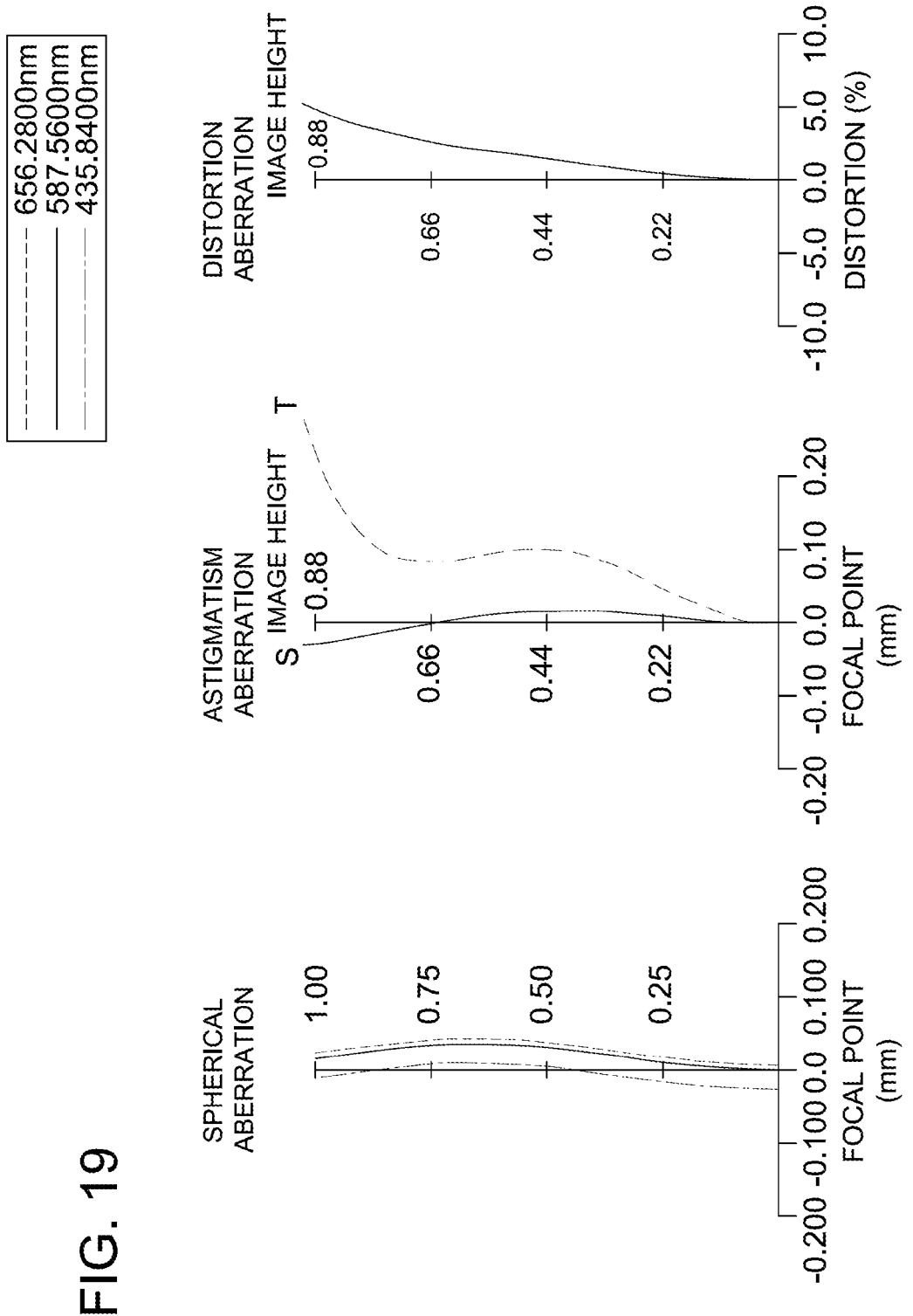
FIG. 19 is an explanation diagram showing different aberrations of an image pickup device of a referential example 6.

See FIG. 19

| Unit: mm | | | | |
|---|---|---|---|---|
| <Surface data> | | | | |
| Si: | r | d | n | vd |
| 1 (aperture stop): | ∞ | 0.116 | | |
| 2*: | 0.720 | 0.570 | 1.50710 | 54.00 |
| 3: | ∞ | 0.100 | 1.57370 | 29.00 |
| 4*: | 24.486 | 0.100 | | |
| 5: | ∞ | 0.700 | 1.51633 | 64.10 |
| 6: | ∞ | 0.382 | | |

-continued

Unit: mm

<Aspherical data>

Surface S2

K = −8.48E−01,
A = −6.59E−01, B = 5.00E+01, C = −7.06E+02, D = 3.16E+03,
E = 0.00E+00, F = 0.00E+00, G = 0.00E+00, H = 0.00E+00,
J = 0.00E+00

Surface S4

K = −1.00E+00,
A = 2.47E+00, B = −1.88E+01, C = 1.34E+02, D = −3.21E+02,
E = 0.00E+00, F = 0.00E+00, G = 0.00E+00, H = 0.00E+00,
J = 0.00E+00

Referential Example 7

Figure 20:
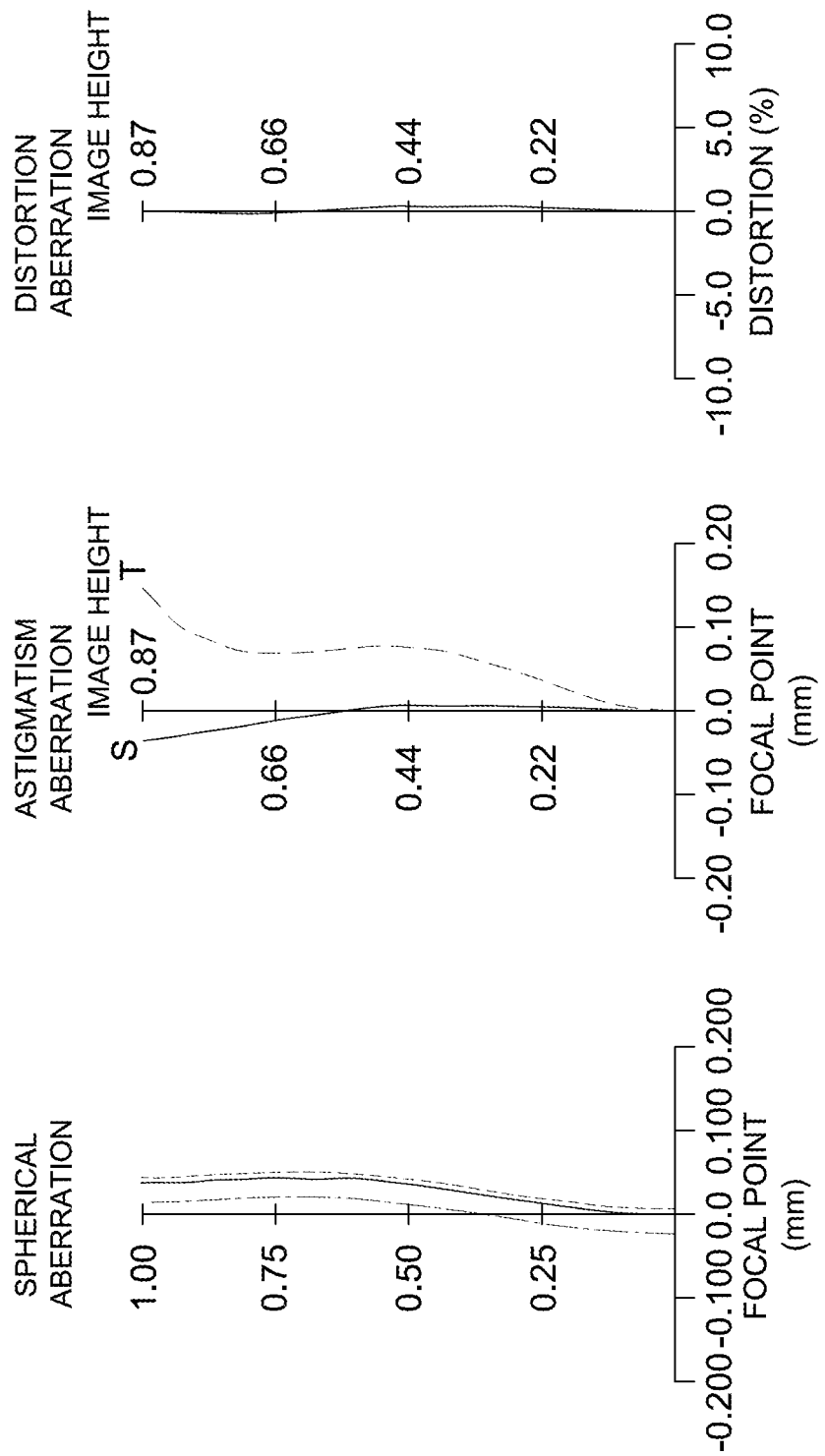
FIG. 20 is an explanation diagram showing different aberrations of an image pickup device of a referential example 7.

See FIG. 20

Unit: mm

<Surface data>

| Si: | r | d | n | vd |
|---|---|---|---|---|
| 1 (aperture stop): | ∞ | 0.116 | | |
| 2*: | 0.720 | 0.570 | 1.50710 | 54.00 |
| 3: | ∞ | 0.100 | 1.57370 | 29.00 |
| 4*: | 24.486 | 0.500 | | |
| 5: | ∞ | 1.300 | 1.51633 | 64.10 |
| 6: | ∞ | 0.088 | | |

<Aspherical data>

Surface S2

K = −1.54E+00,
A = −6.59E−01, B = 5.00E+01, C = −7.06E+02, D = 3.16E+03,
E = 0.00E+00, F = 0.00E+00, G = 0.00E+00, H = 0.00E+00,
J = 0.00E+00

Surface S4

K = 1.62E+02,
A = 1.88E+00, B = −1.16E+01, C = 7.90E+01, D = −1.84E+02,
E = 0.00E+00, F = 0.00E+00, G = 0.00E+00, H = 0.00E+00,
J = 0.00E+00

Example 8

Figure 21:
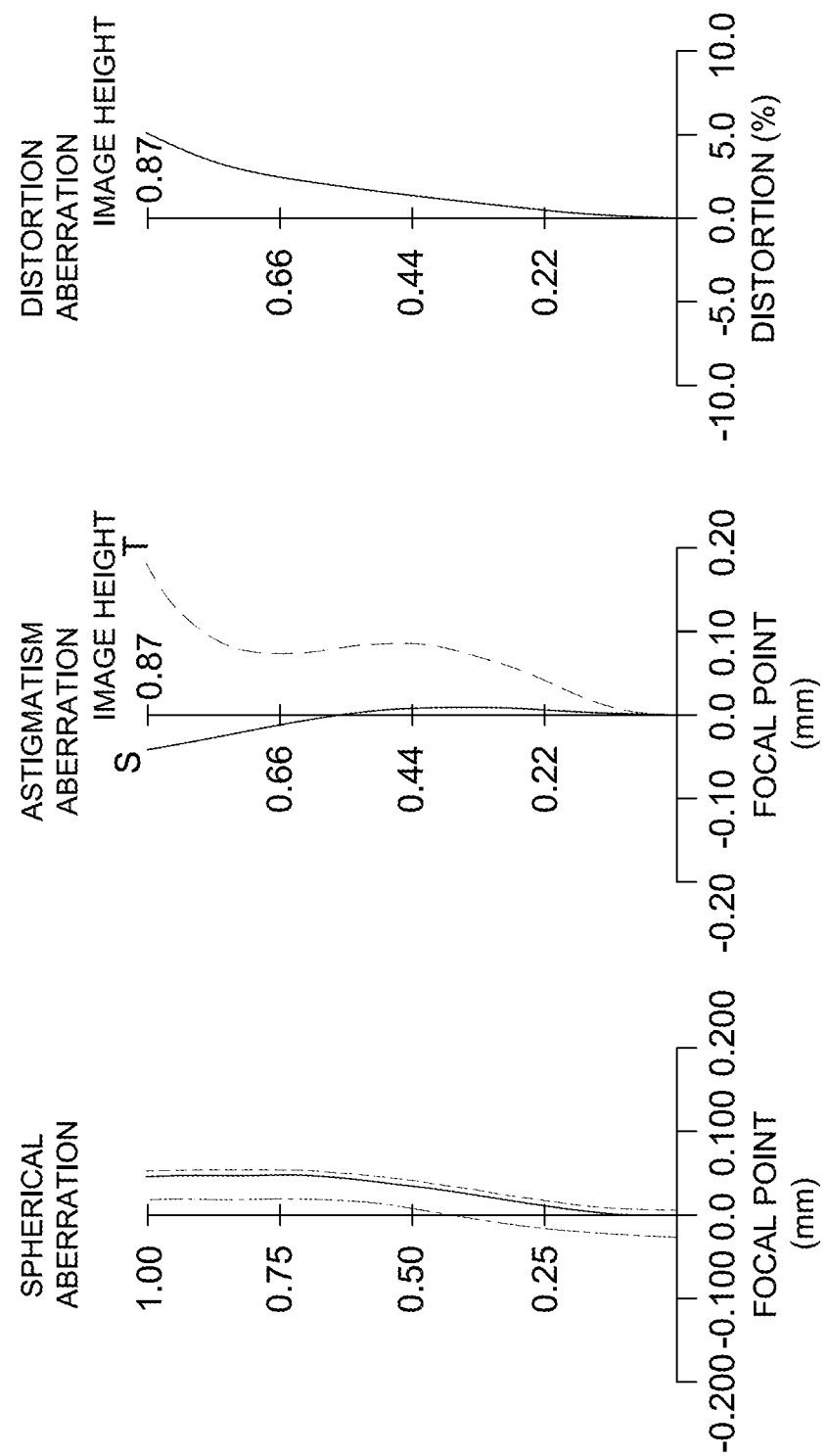
FIG. 21 is an explanation diagram showing different aberrations of an image pickup device of an example 8.

See FIG. 21

Unit: mm

<Surface data>

| Si: | r | d | n | vd |
|---|---|---|---|---|
| 1 (aperture stop): | ∞ | 0.116 | | |
| 2*: | 0.700 | 0.050 | 1.50710 | 54.00 |
| 3: | ∞ | 0.570 | 1.52470 | 56.20 |
| 4: | ∞ | 0.050 | 1.50710 | 54.00 |
| 5*: | 24.486 | 0.100 | | |
| 6: | ∞ | 0.700 | 1.51633 | 64.10 |
| 7: | ∞ | 0.398 | | |

-continued

Unit: mm

<Aspherical data>

Surface S2

K = −1.53E+00,
A = −6.59E−01, B = 5.00E+01, C = −7.06E+02, D = 3.16E+03,
E = 0.00E+00, F = 0.00E+00, G = 0.00E+00, H = 0.00E+00,
J = 0.00E+00

Surface S5

K = −1.00E+00,
A = 2.59E+00, B = −1.63E+01, C = 1.09E+02, D = −2.63E+02,
E = 0.00E+00, F = 0.00E+00, G = 0.00E+00, H = 0.00E+00,
J = 0.00E+00

Example 9

Figure 22:
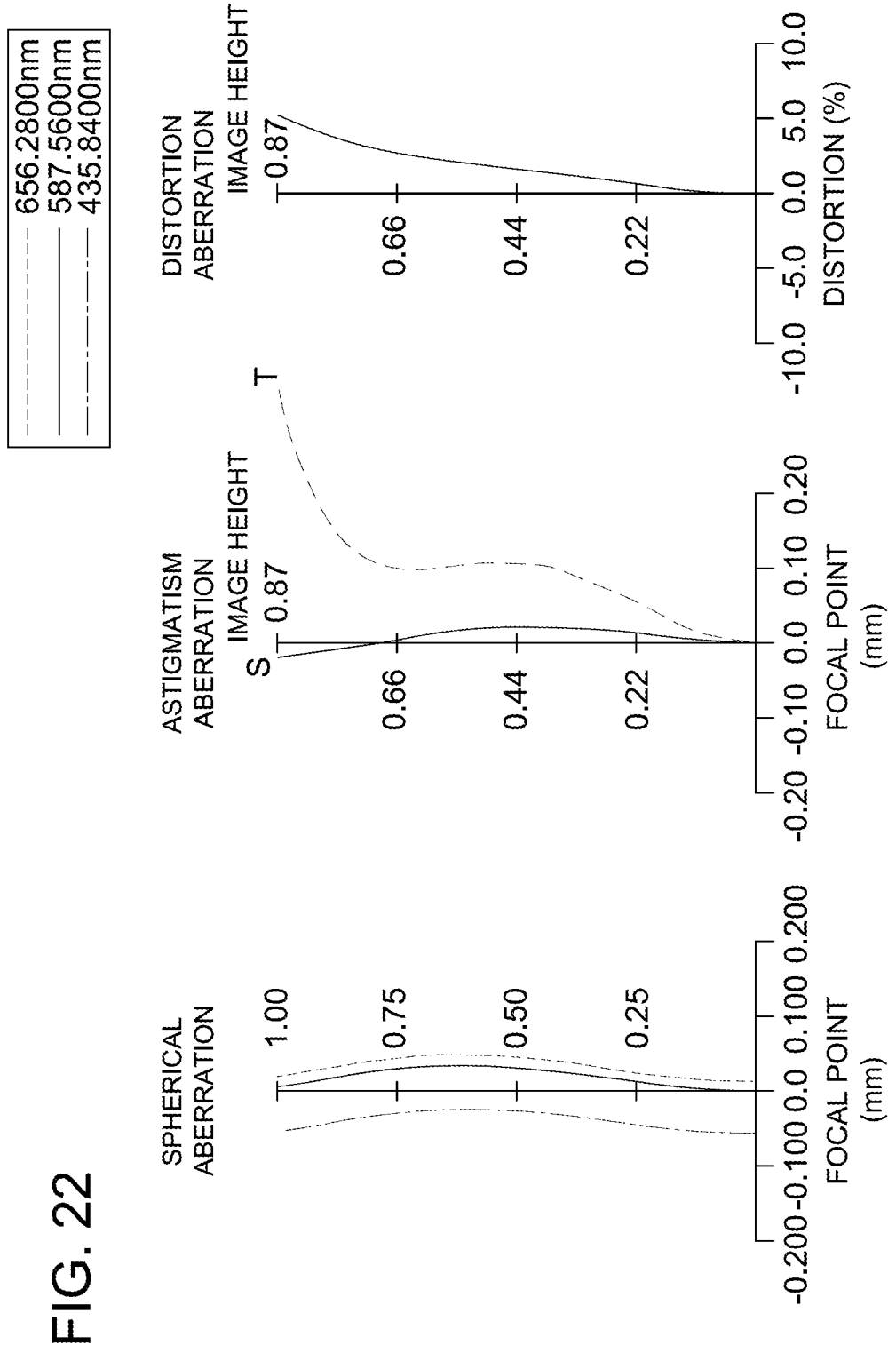
FIG. 22 is an explanation diagram showing different aberrations of an image pickup device of an example 9.

See FIG. 22

Unit: mm

<Surface data>

| Si: | r | d | n | vd |
|---|---|---|---|---|
| 1 (aperture stop): | ∞ | 0.116 | | |
| 2*: | 0.802 | 0.050 | 1.57370 | 29.00 |
| 3: | ∞ | 0.570 | 1.52470 | 56.20 |
| 4: | ∞ | 0.050 | 1.57370 | 29.00 |
| 5*: | 24.486 | 0.100 | | |
| 6: | ∞ | 0.700 | 1.51633 | 64.10 |
| 7: | ∞ | 0.398 | | |

<Aspherical data>

Surface S2

K = −8.60E−01,
A = −6.59E−01, B = 5.00E+01, C = −7.06E+02, D = 3.16E+03,
E = 0.00E+00, F = 0.00E+00, G = 0.00E+00, H = 0.00E+00,
J = 0.00E+00

Surface S5

K = −1.00E+00,
A = 2.47E+00, B = −1.88E+01, C = 1.34E+02, D = −3.21E+02,
E = 0.00E+00, F = 0.00E+00, G = 0.00E+00, H = 0.00E+00,
J = 0.00E+00

Example 10

Figure 23:
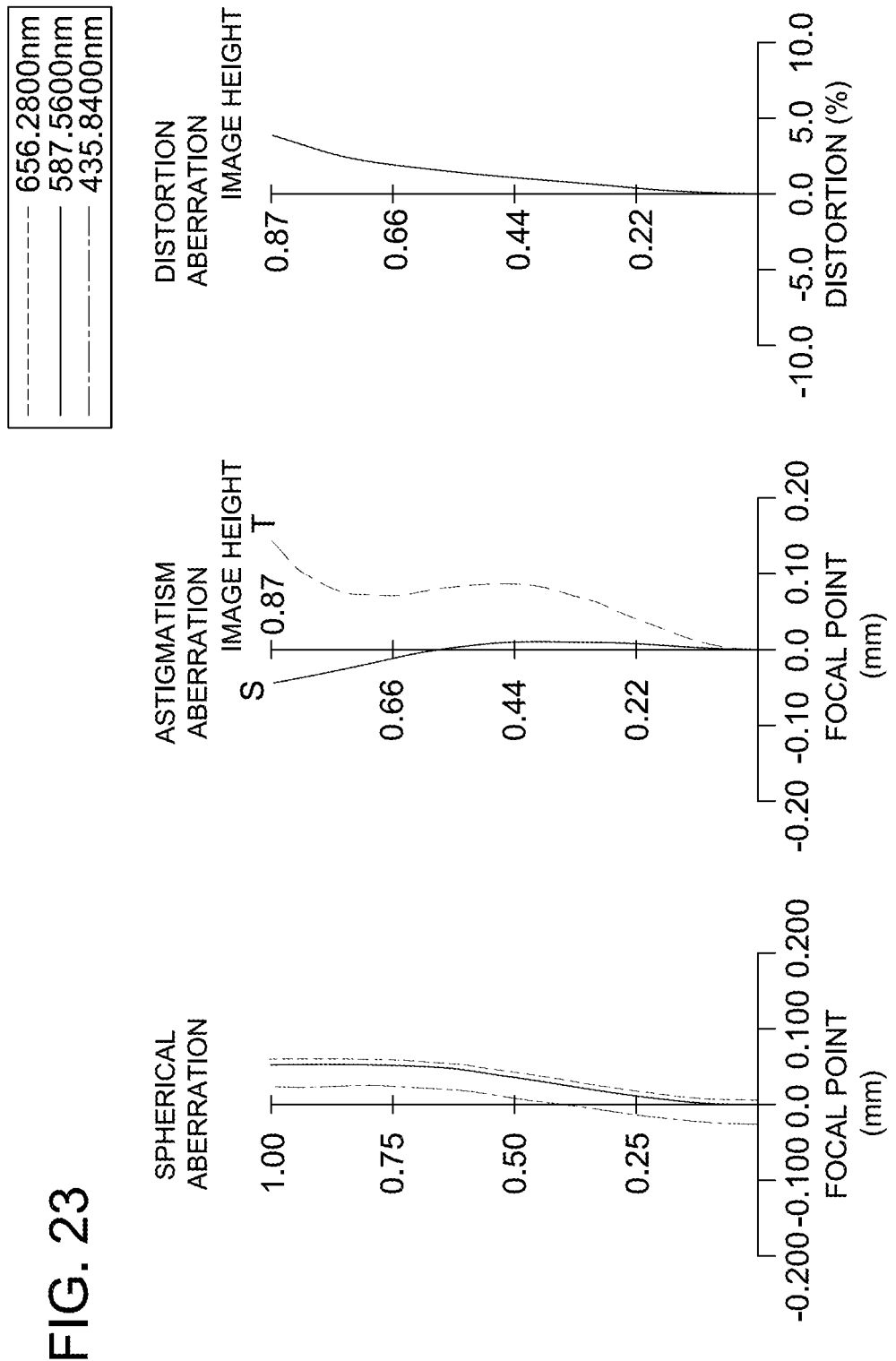
FIG. 23 is an explanation diagram showing different aberrations of an image pickup device of an example 10.

See FIG. 23

Unit: mm

<Surface data>

| Si: | r | d | n | vd |
|---|---|---|---|---|
| 1 (aperture stop): | ∞ | 0.116 | | |
| 2*: | 0.700 | 0.050 | 1.50710 | 54.00 |
| 3: | ∞ | 0.570 | 1.60770 | 56.20 |
| 4: | ∞ | 0.050 | 1.50710 | 54.00 |
| 5*: | 24.486 | 0.100 | | |
| 6: | ∞ | 0.700 | 1.51633 | 64.10 |

-continued

Unit: mm

| 7: | ∞ | 0.418 |

<Aspherical data>

Surface S2

K = −1.53E+00,
A = −6.59E−01, B = 5.00E+01, C = −7.06E+02, D = 3.16E+03,
E = 0.00E+00, F = 0.00E+00, G = 0.00E+00, H = 0.00E+00,
J = 0.00E+00

Surface S5

K = −1.00E+00,
A = 2.60E+00, B = −1.63E+01, C = 1.09E+02, D = −2.63E+02,
E = 0.00E+00, F = 0.00E+00, G = 0.00E+00, H = 0.00E+00,
J = 0.00E+00

Example 11

Figure 24:
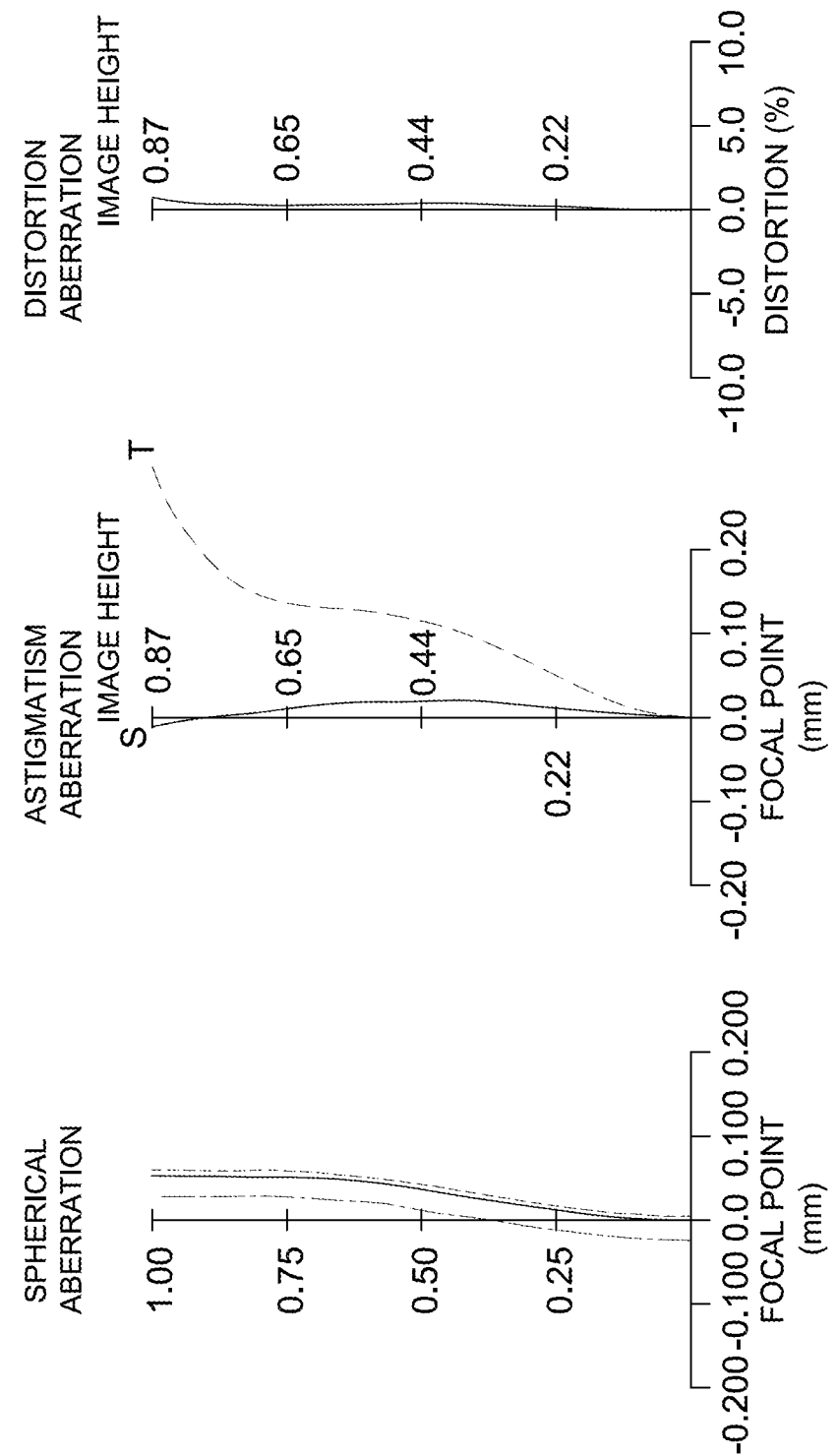
FIG. 24 is an explanation diagram showing different aberrations of an image pickup device of an example 11.

See FIG. 24

Unit: mm

<Surface data>

| Si: | r | d | n | vd |
|---|---|---|---|---|
| 1 (aperture stop): | ∞ | 0.116 | | |
| 2*: | 0.700 | 0.050 | 1.50710 | 54.00 |
| 3: | ∞ | 0.570 | 1.60770 | 56.20 |
| 4: | ∞ | 0.050 | 1.50710 | 54.00 |
| 5*: | 24.486 | 0.050 | | |
| 6: | ∞ | 1.300 | 1.51633 | 64.10 |
| 7: | ∞ | 0.072 | | |

<Aspherical data>

Surface S2

K = −1.53E+00,
A = −6.59E−01, B = 5.00E+01, C = −7.06E+02, D = 3.16E+03,
E = 0.00E+00, F = 0.00E+00, G = 0.00E+00, H = 0.00E+00,
J = 0.00E+00

Surface S5

K = −1.00E+00,
A = 2.60E+00, B = −1.63E+01, C = 1.09E+02, D = −2.63E+02,
E = 0.00E+00, F = 0.00E+00, G = 0.00E+00, H = 0.00E+00,
J = 0.00E+00
110

Example 12

Figure 25:
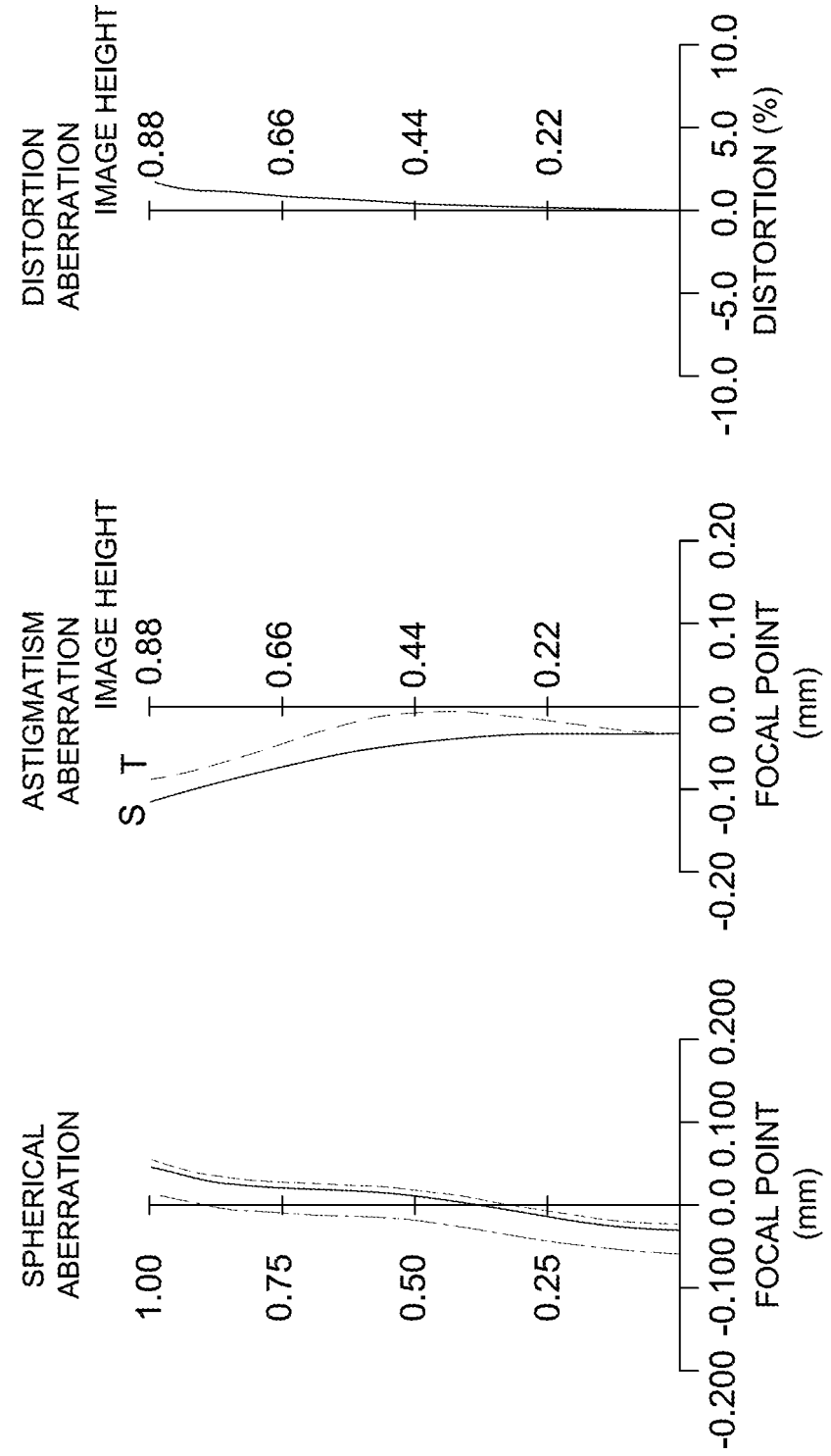
FIG. 25 is an explanation diagram showing different aberrations of an image pickup device of an example 12.

See FIG. 25

Unit: mm

<Surface data>

| Si: | r | d | n | vd |
|---|---|---|---|---|
| 1*: | 0.802 | 0.050 | 1.50710 | 54.00 |
| 2 (aperture stop): | ∞ | 0.670 | 1.60770 | 56.20 |
| 3: | ∞ | 0.050 | 1.50710 | 54.00 |
| 4*: | 100.000 | 0.050 | | |
| 5: | ∞ | 0.880 | 1.51633 | 64.10 |
| 6: | ∞ | 0.4712 | | |

<Aspherical data>

Surface S1

K = −1.53E+00,
A = −6.59E−01, B = 5.00E+01, C = −9.55E+02, D = 6.20E+03,
E = 0.00E+00, F = 0.00E+00, G = 0.00E+00, H = 0.00E+00,
J = 0.00E+00

Surface S4

K = −1.00E+00,
A = 1.83E+00, B = −1.42E+01, C = 1.12E+02, D = −3.39E+02,
E = 0.00E+00, F = 0.00E+00, G = 0.00E+00, H = 0.00E+00,
J = 0.00E+00

Table 1 shows the values corresponding to the conditional expressions and various data in referential examples and examples 1 through 12. The various data include the focal length (f, mm), image height (Y, mm), back focus (BF, mm), F-number (F no), half angle of view ($\omega$, °) and overall optical length (TL, mm). The image height is the value free of distortion, and the angle of view is the value incorporating the distortion. The back focus is shown in terms of air equivalent length (the back focus included in the overall optical length is in the same way).

TABLE 1

| | Referential example 1 | Example 2 | Referential example 3 | Referential example 4 | Referential example 5 | Referential example 6 |
|---|---|---|---|---|---|---|
| ν1 | 29.00 | 29.00 | 29.00 | 54.00 | 54.00 | 54.00 |
| ν2 | — | — | — | 29.00 | 29.00 | 29.00 |
| f1 | 2.202 | 2.347 | 2.202 | 2.298 | 2.192 | 2.140 |
| f2 | −42.705 | −42.705 | −42.705 | −42.335 | −42.335 | −42.705 |
| Conditional expression (1) | −0.05 | −0.05 | −0.05 | −0.05 | −0.05 | −0.05 |
| Conditional expression (2) | — | — | — | 25.000 | 25.000 | 25.000 |
| Conditional expression | — | — | 0.48 | — | 0.87 | 0.48 |

TABLE 1-continued

| (3) Conditional expression (4) | — | — | 0.109 | — | 0.106 | 0.106 |
|---|---|---|---|---|---|---|
| f | 1.432 | 1.432 | 1.432 | 1.492 | 1.492 | 1.454 |
| Y | 0.880 | 0.880 | 0.880 | 0.880 | 0.880 | 0.880 |
| BF | 1.00 | 1.02 | 1.00 | 1.04 | 1.04 | 1.00 |
| F no | 2.8 | 2.8 | 2.8 | 2.8 | 2.8 | 2.8 |
| ω | 31.57 | 31.57 | 31.57 | 30.54 | 30.54 | 31.19 |
| TL | 1.81 | 1.84 | 2.04 | 1.82 | 2.30 | 2.05 |

| | Referential example 7 | Example 8 | Example 9 | Example 10 | Example 11 | Example 12 |
|---|---|---|---|---|---|---|
| ν1 | 54.00 | 54.00 | 29.00 | 54.00 | 54.00 | 54.00 |
| ν2 | 29.00 | — | — | — | — | — |
| f1 | 2.134 | 2.105 | 2.134 | 2.220 | 2.220 | 2.540 |
| f2 | −42.335 | −48.301 | −42.705 | −48.301 | −48.301 | −197.260 |
| Conditional expression (1) | −0.05 | −0.04 | −0.05 | −0.05 | −0.05 | −0.01 |
| Conditional expression (2) | 25.000 | — | — | — | — | — |
| Conditional expression (3) | 0.90 | 0.50 | 0.48 | 0.50 | 0.92 | 0.554 |
| Conditional expression (4) | 0.111 | 0.111 | 0.109 | 0.112 | 0.118 | 0.107 |
| f | 1.447 | 1.408 | 1.432 | 1.409 | 1.409 | 1.590 |
| Y | 0.880 | 0.880 | 0.880 | 0.880 | 0.880 | 0.880 |
| BF | 0.99 | 0.96 | 0.98 | 0.98 | 0.98 | 0.47 |
| F no | 2.8 | 2.8 | 2.8 | 2.8 | 2.8 | 2.8 |
| ω | 31.31 | 32.00 | 31.58 | 31.99 | 31.99 | 28.96 |
| TL | 2.26 | 2.01 | 2.03 | 2.03 | 2.24 | 2.20 |

INDUSTRIAL APPLICABILITY

The imaging lens of the present invention is characterized by reduced overall optical length, reduced sensor incident angle, reduced distortion and excellent aberration performances, although the aforementioned imaging lens is provided with the lens unit wherein the object side surface is convex toward the object side and the image side surface is concave toward the image side. The imaging lens of the present invention can be applied to the wafer scale lens using a cemented lens, and the optical system provided therewith.

The invention claimed is:

1. An imaging lens, comprising:
   an aperture diaphragm; and
   a lens unit having a positive power, the lens unit including, in order from an object side:
      a first lens which is a plano-convex lens having a convex surface directed toward the object side;
      a second lens which is a parallel plane plate, and is cemented to the first lens; and
      a third lens which is a plano-concave lens having a concave surface directed toward an image side,
   wherein the following conditional relationship is satisfied, $$-0.7 < f1/f2 < 0$$

where:
   f1 is a focal length of the first lens; and
   f2 is a focal length of the third lens.

2. The imaging lens of claim 1, comprising:
   a parallel plane surface plate provided on the image side of the lens unit.

3. The imaging lens of claim 2, wherein the following conditional relationship is satisfied, $$0.1 \leq Dg/f < 1.0$$

where:
   Dg is a thickness of the parallel plane surface plate; and
   f is an overall focal length of the imaging lens.

4. The imaging lens of claim 3, wherein the following conditional relationship is satisfied, $$(l_2 - l_1)/f < 0.14$$

where:
   $l_1$ is an optical path length of an axial ray between an image side surface of the lens unit and an image plane; and
   $l_2$ is an optical path length of a principal ray at a maximum image height between the image side surface of the lens unit and the image plane.

5. The imaging lens of claim 1, wherein the aperture diaphragm is disposed on a boundary surface between the first lens and the second lens.

6. The imaging lens of claim 1, wherein the first lens and the third lens are made of resin.

7. The imaging lens of claim 6, wherein the first lens and the third lens are made of curable resin.

8. The imaging lens of claim 6, wherein there are dispersed inorganic fine particles with a maximum length of 30 nm or less in the first lens and the third lens.

9. The imaging lens of claim 1 manufactured by a manufacturing method comprising the steps of:
   forming a plurality of the first lenses and a plurality of the third lenses simultaneously on a first parallel plane substrate which makes a plurality of the parallel plane plates when cut apart;
   sealing the first parallel plane substrate and a second parallel plane substrate through a lattice-shaped spacer sandwiched therebetween; and cutting apart the first parallel plane substrate, the second parallel plane substrate, and the spacer, which have all been integrated into one body, along a lattice of the spacer.

10. The imaging lens of claim 1, wherein in the lens unit, at least a surface being in contact with air and having a power is aspherical.

11. An image pickup device, comprising:
the imaging lens of claim 1; and
an image sensor which receives light obtained through the imaging lens to generate an electric signal depending on an amount of received light.

12. A portable terminal, comprising:
the image pickup device of claim 11; and
a display device for displaying an image represented by the electric signal generated by the image sensor.

* * * * *